US011346600B2

(12) United States Patent
Ogawa et al.

(10) Patent No.: US 11,346,600 B2
(45) Date of Patent: May 31, 2022

(54) METHOD OF SETTING SYSTEM AND PROCESSING DEVICE

(71) Applicant: Panasonic Intellectual Property Corporation of America, Torrance, CA (US)

(72) Inventors: Takanori Ogawa, Kanagawa (JP); Hiroki Takeuchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 317 days.

(21) Appl. No.: 16/517,935

(22) Filed: Jul. 22, 2019

(65) Prior Publication Data
US 2020/0041199 A1 Feb. 6, 2020

Related U.S. Application Data

(60) Provisional application No. 62/714,959, filed on Aug. 6, 2018.

(51) Int. Cl.
*F25D 23/04* (2006.01)
*F25D 29/00* (2006.01)
(Continued)

(52) U.S. Cl.
CPC ......... *F25D 29/005* (2013.01); *F25D 23/006* (2013.01); *F25D 23/04* (2013.01);
(Continued)

(58) Field of Classification Search
CPC ............. F25D 2700/06; F25D 2400/36; F25D 2400/361; F25D 2500/06; F25D 2600/06; G06Q 30/02
See application file for complete search history.

(56) References Cited

U.S. PATENT DOCUMENTS

| 9,920,982 B2 * | 3/2018 | Kim | F25D 23/00 |
| 2002/0178066 A1 * | 11/2002 | Roh | G06Q 30/06 |
| | | | 705/22 |

(Continued)

FOREIGN PATENT DOCUMENTS

| CN | 103363751 | 10/2013 |
| JP | 2003-50077 | 2/2003 |

OTHER PUBLICATIONS

English translation of Search Report dated Mar. 25, 2022 in corresponding Chinese Patent Application No. 201910688433.3.

*Primary Examiner* — Lionel Nouketcha
(74) *Attorney, Agent, or Firm* — Wenderoth, Lind & Ponack, L.L.P.

(57) ABSTRACT

Provided is a method of setting a system, the method being performed by a processor and including: (a) when receiving detection, by the sensor, of a first amount of goods equal to or larger than a first predetermined amount, displaying, on a display, a first screen prompting setting of a threshold amount of goods corresponding to a condition of trigger output; (b) when the sensor detects reduction of an amount of goods by at least a second predetermined amount after displaying the first screen, acquiring, as the threshold amount, a second amount of reduced goods; (c) after the threshold amount is acquired, displaying, on the display, a second screen for setting an action of the processing device; and (d) based on information on the action set after displaying the second screen, setting output contents to be output by the processing device upon satisfaction of the condition of trigger output.

12 Claims, 41 Drawing Sheets

(51) Int. Cl.
*F25D 23/00* (2006.01)
*G06Q 30/02* (2012.01)

(52) U.S. Cl.
CPC .... *F25D 2400/36* (2013.01); *F25D 2400/361* (2013.01); *F25D 2500/06* (2013.01); *F25D 2600/06* (2013.01); *F25D 2700/06* (2013.01); *G06Q 30/02* (2013.01)

(56) References Cited

U.S. PATENT DOCUMENTS

| | | | | |
|---|---|---|---|---|
| 2014/0019311 A1* | 1/2014 | Tanaka | .................. | G07F 9/0235 |
| | | | | 705/27.2 |
| 2017/0219278 A1* | 8/2017 | Hui | ....................... | F25D 25/027 |
| 2018/0342329 A1* | 11/2018 | Rufo | .................. | H04L 12/2812 |

* cited by examiner

FIG. 6

| TIME | AMOUNT |
|---|---|
| 2020/1/1 13:00:00 | 0 g |
| 2020/1/1 13:00:10 | 500 g |
| 2020/1/1 13:01:00 | 140 g |
| 2020/1/1 13:03:00 | 500 g |
| 2020/1/1 17:00:00 | 420 g |
| 2020/1/2 7:20:00 | 300 g |
| ... | ... |
| 2020/1/4 7:00:00 | 140 g |

| FIRST PREDETERMINED AMOUNT (ABSOLUTE VALUE) | SECOND PREDETERMINED AMOUNT (RELATIVE VALUE) |
|---|---|
| 10 g | 10 g |

FIG. 21

| TIME | NUMBER OF GOODS |
|---|---|
| 2020/1/1 13:00:00 | 0 |
| 2020/1/1 13:00:10 | 6 |
| 2020/1/1 13:01:00 | 2 |
| 2020/1/1 13:03:00 | 6 |
| 2020/1/1 17:00:00 | 5 |
| 2020/1/2 7:20:00 | 4 |
| ... | ... |
| 2020/1/4 7:00:00 | 2 |

| ITEM ID | USAGE AMOUNT AT EACH TIME | RETURNED/ NOT RETURNED |
|---|---|---|
| 001 | — | NOT RETURNED |
| 002 | 20 g | RETURNED |
| 003 | 10% | RETURNED |
| ... | ... | ... |

FIG. 34

| TIME | AMOUNT |
|---|---|
| 2020/1/1 13:00:00 | 0 ml |
| 2020/1/1 13:00:10 | 1000 ml |
| 2020/1/1 13:01:00 | 200 ml |
| 2020/1/1 13:03:00 | 800 ml |
| 2020/1/1 17:00:00 | 700 ml |
| 2020/1/2 7:20:00 | 500 ml |
| ... | ... |
| 2020/1/4 7:00:00 | 200 ml |

← S100
← S200 · S300
← S400 · S600

← S1200

METHOD OF SETTING SYSTEM AND PROCESSING DEVICE

CROSS REFERENCE TO RELATED APPLICATION

This application claims the benefit of priority of U.S. Provisional Patent Application No. 62/714,959 filed on Aug. 6, 2018, the entire content of which is hereby incorporated by reference.

BACKGROUND

1. Technical Field

The present disclosure relates to a method of setting a parameter in a system that performs a predetermined action according to the amount of goods, and a processing device included in the system.

2. Description of the Related Art

In a disclosed technique of the related art, the amount of remaining goods is measured using sensors mounted in a refrigerator and food products are automatically ordered when the amount of remaining foods falls below a predetermined minimum proper amount (for example, see Japanese Unexamined Patent Application Publication No. 2003-50077).

SUMMARY

The refrigerator described in Japanese Unexamined Patent Application Publication No. 2003-50077 measures the storage start date of foods stored in a storage part, the number of stored food products, and the amount of remaining foods and outputs the state on a screen. However, Japanese Unexamined Patent Application Publication No. 2003-50077 does not disclose a state acting as a trigger and the setting of the output.

The present disclosure provides a method of setting a system, whereby a predetermined action and a trigger for the predetermined action can be set in the system for performing the predetermined action according to the amount of goods.

A method of setting a system according to an aspect of the present disclosure is a method of setting a system, the system including: a processing device including a processor and a memory; and a sensor that is communicably connected to the processing device and detects an amount of goods, the method being performed by the processor and including: (a) when receiving detection of a first amount of goods by the sensor, displaying, on a display, a first screen prompting setting of a threshold amount of goods which corresponds to a condition of trigger output, the first amount being equal to or larger than a first predetermined amount; (b) when the sensor detects that an amount of goods has been reduced by at least a second predetermined amount after the displaying of the first screen, acquiring, as the threshold amount, a second amount of reduced goods detected by the sensor; (c) after the threshold amount is acquired, displaying, on the display, a second screen for setting a first action of the processing device; and (d) based on information on the first action which has been set after the displaying of the second screen, setting first output contents which are to be output by the processing device upon satisfaction of the condition of trigger output.

Note that the above general or specific aspect may be implemented by a system, a method, an integrated circuit, a computer program, or a computer-readable recording medium such as a compact disc read only memory (CD-ROM), or by any combination of systems, methods, integrated circuits, computer programs, or recording media.

A method of setting a system according to an aspect of the present disclosure is capable of setting a predetermined action and a trigger for the predetermined action in the system for performing the predetermined action according to the amount of goods.

BRIEF DESCRIPTION OF DRAWINGS

FIG. 6 shows an example of a time series of the amount of goods in the system according to Embodiment 1;

FIG. 7 shows an example of a first predetermined amount and a second predetermined amount in the system according to Embodiment 1;

FIG. 21 shows an example of a time series of the amount of goods in a system according to the variation of Embodiment 1;

FIG. 22 shows information on the amount of usage at each time in the variation of Embodiment 1;

FIG. 34 shows an example of a time series of the amount of goods in the system according to Embodiment 5;

DETAILED DESCRIPTION OF THE EMBODIMENTS

The following specifically describes exemplary embodiments with reference to the drawings.

Note that the following embodiments each show a general or specific example. The numerical values, shapes, materials, structural elements, the arrangement and connection of the structural elements, steps, order of the steps, etc. illustrated in the following embodiments are mere examples, and are not intended to limit the scope of the claims.

Note also that the drawings are schematic and do not necessarily provide precise depictions. Throughout the drawings, the same reference signs are given to essentially the same structural elements, and redundant descriptions will be omitted or simplified.

Embodiment 1

[Configuration of System 10]

Figure 1:
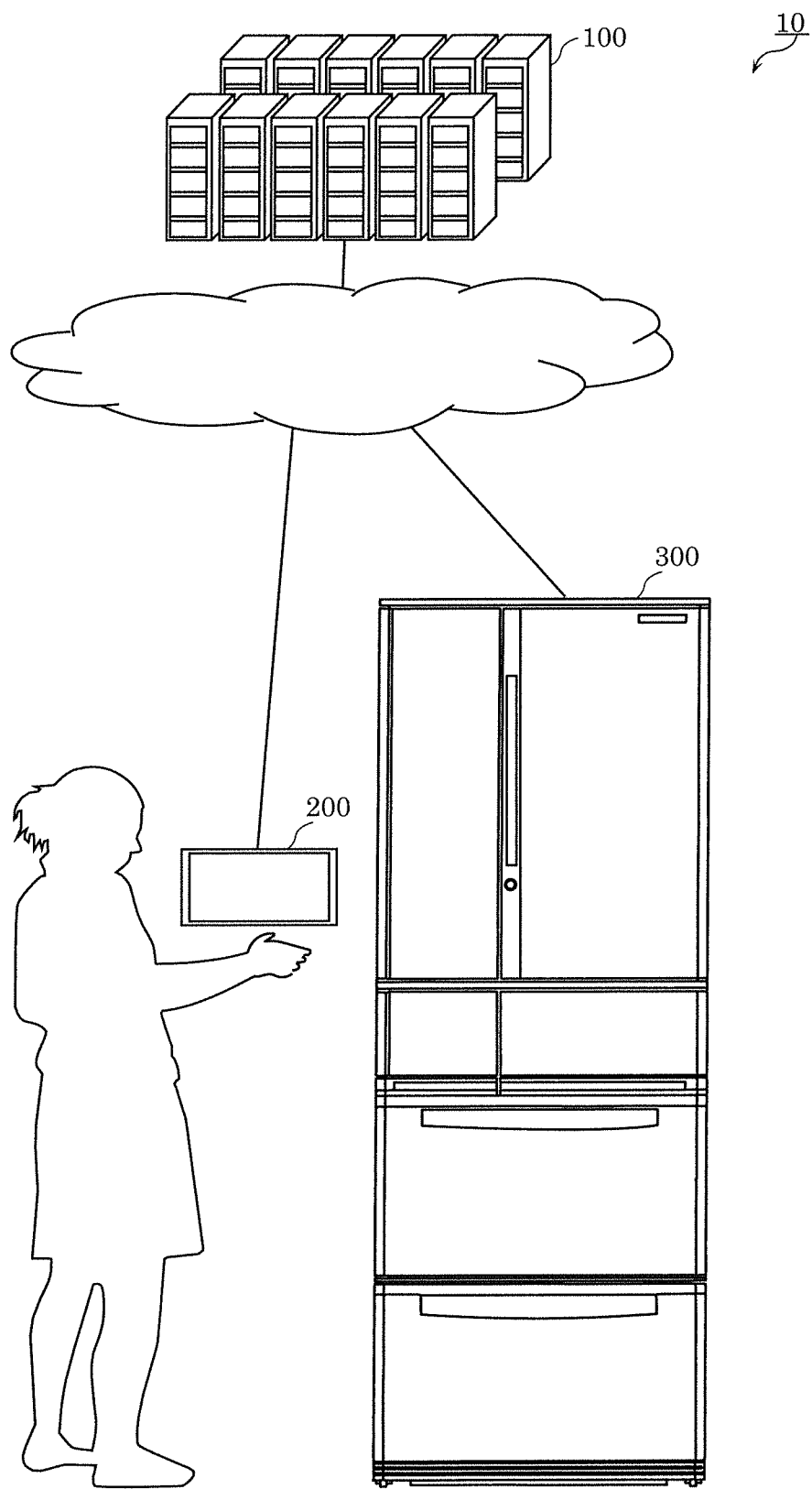
FIG. 1 is an external view of a system and a user according to Embodiment 1.
Figure 2:
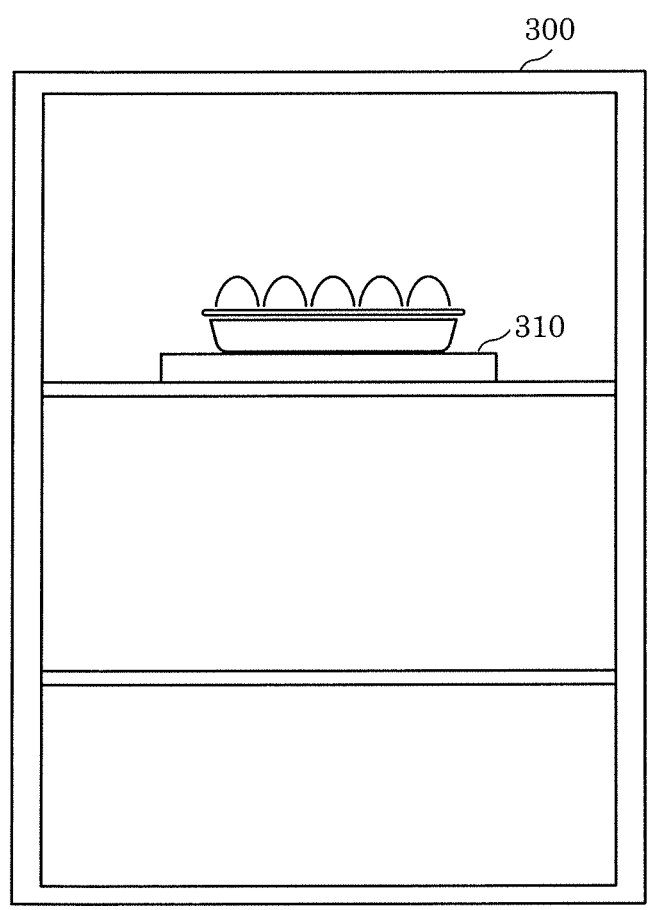
FIG. 2 is a front view illustrating the interior of a refrigerator according to Embodiment 1.
Figure 3:
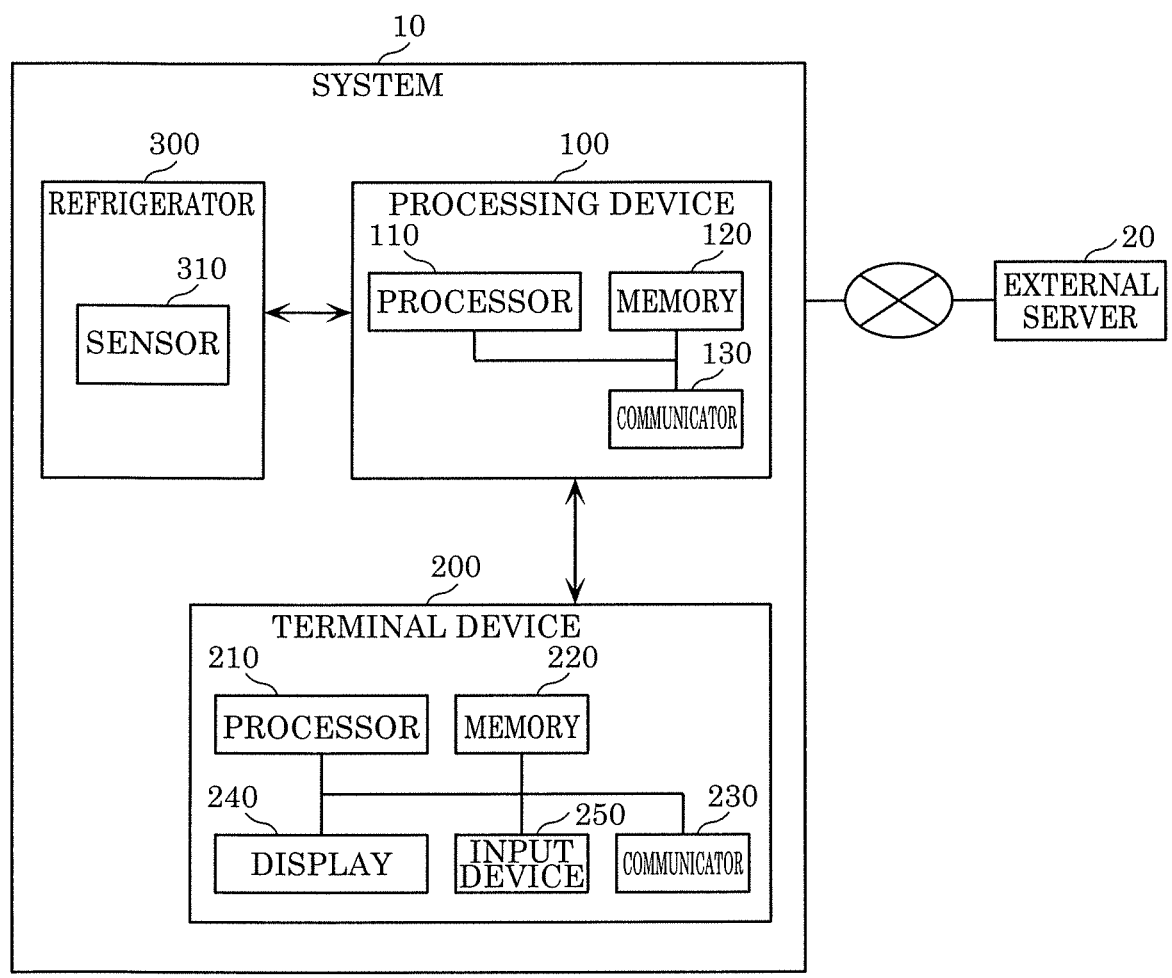
FIG. 3 is a block diagram illustrating a functional configuration of the system according to Embodiment 1.

Referring to FIGS. 1 to 3, the configuration of system 10 according to Embodiment 1 will be described below. FIG. 1 is an external view of system 10 and a user according to Embodiment 1. FIG. 2 is a front view illustrating the interior of refrigerator 300 according to Embodiment 1. FIG. 3 is a block diagram illustrating the functional configuration of system 10 according to Embodiment 1.

System 10 performs a predetermined action according to the amount of goods detected by sensor 310. System 10 is connected to external server 20 via a communication network or the like. System 10 includes processing device 100, one or more terminal devices including terminal device 200, and refrigerator 300. Processing device 100, one or more terminal devices, and sensor 310 in refrigerator 300 are connected so as to communicate with one another. Terminal device 200 will be described as a representative terminal device and the explanation of other terminal devices is omitted.

Processing device 100 is implemented by, for example, a cloud server. Processing device 100 controls the indication of display 240 of terminal device 200 based on information received from sensor 310 in refrigerator 300.

Processing device 100 is not limited to a cloud server. For example, processing device 100 may be built into refrigerator 300. Alternatively, processing device 100 may be, for example, a portable terminal (e.g., a smartphone or a tablet computer) or a fixed terminal.

Processor 200 has display 240. A screen is displayed on display 240 based on screen information received from processing device 100. In the present embodiment, terminal device 200 is attached to a wall surface in a building where refrigerator 300 is installed. Alternatively, terminal device 200 may be attached to an electrical appliance or furniture in a building.

Terminal device 200 may not be attached to a wall surface, an electrical appliance, or furniture in a building. Terminal device 200 may be, for example, a portable terminal (e.g., a smartphone or a tablet computer). Alternatively, terminal device 200 may be built into refrigerator 300.

Refrigerator 300 stores one or more goods. In refrigerator 300, sensor 310 for detecting the amount of goods is installed. Goods mean material goods other than real estates. The material goods are used to be reduced or exhausted. For example, goods include foods (including drinks and seasonings), consumer goods (e.g., detergents and batteries), and industrial materials.

Sensor 310 detects the amount of goods. Sensor 310 detects the amount of goods, for example, when the door of refrigerator 300 is opened or closed. For example, sensor 310 may detect the amount of goods at regular intervals (e.g., one minute, three minutes, or five minutes).

In the present embodiment, sensor 310 is a sheet-type weight sensor detachably attached to a shelf board or the bottom of a door shelf. The weight sensor can detect the weight of foods and the weight of a container that contains beverages or seasonings.

Sensor 310 detachably attached in refrigerator 300 may be fixed in refrigerator 300. Alternatively, sensor 310 may not have a communication function. In this case, sensor 310 may be connected to a communication device (e.g., a communication adapter or a communication hub) capable of communicating with processing device 100 and communicate with processing device 100 via the communication device.

[Internal Configuration of Processing Device 100]

The internal configuration of processing device 100 will be described below. As shown in FIG. 3, processing device 100 includes processor 110, memory 120, and communicator 130.

Processor 110 is an electronic circuit connected to memory 120. Processor 110 acquires information on the amount of goods from sensor 310 in refrigerator 300. Processor 110 sets system 10 based on the amount of goods. Based on the setting, processor 110 performs processing for a predetermined action if the condition of trigger output is satisfied. The detail of operations of processor 110 will be discussed later according to a flowchart.

Memory 120 is, for example, a semiconductor memory and/or hard disk drive. Memory 120 can store a software program or an instruction. When the software program or the instruction stored in memory 120 is executed, processor 110 can perform various kinds of processing.

Communicator 130 is a network adapter for performing at least one of cable communications and wireless communications with terminal device 200, sensor 310, and external server 20 via a communication network. The communication network may be, for example, the Internet, a WAN (wide area network), a LAN (local area network), or any combination thereof. The wireless communications may be performed using a wireless LAN, Bluetooth (registered trademark), Zigbee (registered trademark), or any combination thereof.

[Internal Configuration of Terminal Device 200]

The internal configuration of terminal device 200 will be described below. As shown in FIG. 3, terminal device 200 includes processor 210, memory 220, communicator 230, display 240, and input device 250.

Processor 210 is an electronic circuit connected to memory 220. Processor 210 displays a screen on display 240 based on screen information received from processing device 100.

Memory 220 is, for example, a semiconductor memory and/or hard disk drive. Memory 220 can store a software program or an instruction. When the software program or the instruction stored in memory 220 is executed, processor 210 can perform various kinds of processing.

Communicator 230 is a network adapter for performing at least one of cable communications and wireless communications with processing device 100 via a communication network.

Display 240 displays a screen based on screen information received from processing device 100. Display 240 is, for example, an LCD (liquid crystal display) or an OLED (organic light-emitting diode) display.

Input device 250 is an input device for receiving an input from a user. For example, input device 250 may be a touch panel (touch screen) integrated with display 240. Input device 250 may be, for example, a mechanical button, a mouse, a keyboard, or any combination thereof with a touch panel.

[Operations of System 10]

Figure 4:
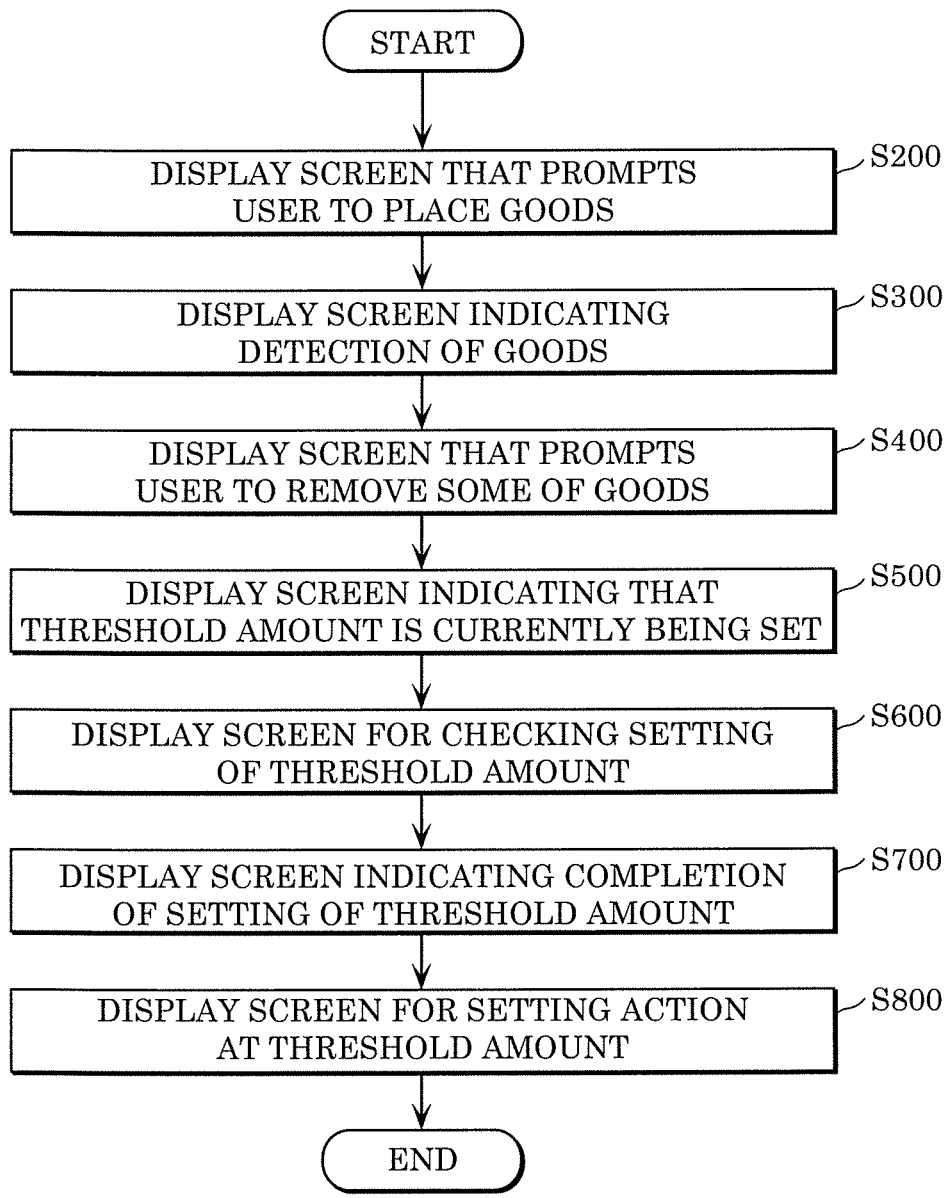
FIG. 4 is a flowchart of processing for setting of the system according to Embodiment 1.
Figure 5:
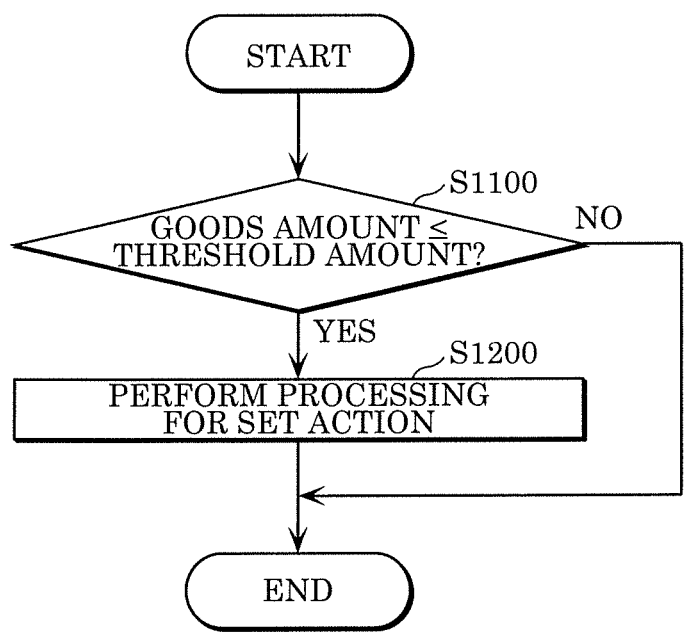
FIG. 5 is a flowchart of processing for actions of the system according to Embodiment 1.

Referring to FIGS. 4 to 7, the operations of system 10 configured thus will be described below. FIG. 4 is a flowchart of processing for the setting of system 10 according to Embodiment 1. FIG. 5 is a flowchart of processing for the actions of system 10 according to Embodiment 1. FIG. 6 shows an example of the time series of the amount of goods in system 10 according to Embodiment 1. FIG. 7 shows an example of a first predetermined amount and a second predetermined amount in system 10 according to Embodiment 1.

[Processing for the Setting of System 10]

Referring to FIG. 4, the processing for the setting of system 10 will be first described below.

[Step S200]

Processor 110 of processing device 100 displays, on display 240 of terminal device 200, a screen that prompts a user to place goods in the detection area of sensor 310. Specifically, processor 110 transmits, for example, screen information to terminal device 200, the screen information including an image and/or characters for requesting the placement of goods onto sensor 310.

Thus, unused goods are placed in the detection area of sensor 310. Sensor 310 detects the amount of placed goods and transmits information on the amount of goods to processing device 100.

[Step S300]

When receiving detection of an amount equal to or larger than the first predetermined amount by sensor 310, processor 110 displays, on display 240, a screen indicating the detection of goods. The first predetermined amount is stored in, for example, memory 120.

For example, in FIG. 6, when receiving "500 g" larger than the first predetermined amount "10 g" (FIG. 7) as a first amount of goods from sensor 310, processor 110 transmits screen information to terminal device 200, the screen information indicating the detection of the goods by sensor 310.

[Step S400]

When receiving detection of the first amount of goods by sensor 310, the first amount being equal to or larger than the first predetermined amount, processor 110 displays, on display 240, a first screen prompting the setting of a threshold amount of goods which corresponds to the condition of trigger output. In other words, processor 110 displays a screen on display 240 so as to prompt a user to remove some of the goods placed in the detection area of sensor 310 until some of goods reaches the threshold amount.

The condition of trigger output means a condition for outputting a command (trigger) that starts a preset action. Thus, a trigger is outputted when the condition of trigger output is satisfied. In this case, the condition of trigger output is an amount reaching the threshold amount.

[Step S500]

Processor 110 displays, on display 240, a screen indicating that a threshold amount is currently being set. For example, processor 110 displays the amount of goods detected by sensor 310 on display 240 and updates the display as the amount decreases.

A user removes some of the goods while the screen is displayed, so that the amount decreases in the detection area of sensor 310.

[Step S600]

Processor 110 displays, on display 240, a screen for checking the setting of a threshold amount. Specifically, when sensor 310 detects that the amount of goods has been reduced by at least the second predetermined amount after the display of the first screen in step S400, processor 110 acquires, as the threshold amount, a second amount of reduced goods detected by sensor 310. After that, processor 110 transmits information on the acquired threshold amount to terminal device 200. The second predetermined amount is stored in, for example, memory 120.

For example, in FIG. 6, when receiving detection that a reduction in the amount of goods is equal to or larger than the second predetermined amount "10 g" (FIG. 7), processor 110 acquires, as a threshold amount, the reduced amount "140 g" detected by sensor 310.

[Step S700]

Processor 110 displays, on display 240, a screen indicating the completion of the setting of the threshold amount. This allows the user to recognize the completion of the setting of the threshold goods amount corresponding to the condition of trigger output.

[Step S800]

After the threshold amount of goods is acquired in step S600, processor 110 displays, on display 240, a second screen for setting the action of processing device 100. After the display of the second screen, the output contents which are to be output by processing device 100 upon satisfaction of the condition of trigger output are set based on information on the set action of processing device 100.

The action of processing device 100 may be, for example, the purchase of goods through electronic commerce (e-commerce), the addition of a product into a shopping cart through electric commerce, and notification to a user.

[Processing for the Action of System 10]

Referring to FIG. 5, the processing for the action of system 10 will be described below. After the threshold amount and the output contents are set by the processing of FIG. 4, sensor 310 is installed in refrigerator 300 and goods are placed in the detection area of sensor 310. Then, the amount of goods is detected by sensor 310, so that the processing of FIG. 5 is performed. The processing of FIG. 5 may be periodically performed at predetermined intervals or may be performed when the amount of goods decreases.

[Step S1100]

Processor 110 determines whether the amount of goods detected by sensor 310 is not larger than the threshold amount. If it is determined that the amount of goods is larger than the threshold amount (No at S1100), the processing is terminated.

[Step S1200]

If it is determined that the amount of goods is not larger than the threshold amount (Yes at S1100), processor 110 performs processing for the action set in step S800. In other words, processor 110 outputs the set output contents. For example, processor 110 outputs goods purchase information to external server 20. For example, processor 110 may output information for adding goods into a shopping cart, to external server 20. Alternatively, processor 110 may output, for example, screen information to terminal device 200, the screen information notifying terminal device 200 that the amount of goods is not larger than the threshold amount.

In FIG. 6, when the amount of goods gradually decreases from "500 g" to "140 g", the threshold amount, processing for the set action is performed.

For example, if a user action is not performed in a predetermined period after the processing of step S1200 is performed, the processing of step S1200 may be performed again. If goods are not purchased in a predetermined period after a notification is made in step S1200, the notification may be provided again.

[Screen Example Displayed in the Setting Processing of System 10]

A screen displayed on display 240 in the processing for the setting of system 10 in FIG. 4 will be discussed below. FIGS. 8 to 19 show screen examples displayed on display 240 in Embodiment 1. In this case, sensor 310 is an egg sensor that measures the weight of eggs. Sensor 310 is connected to a hub having a communication function.

Figure 8:
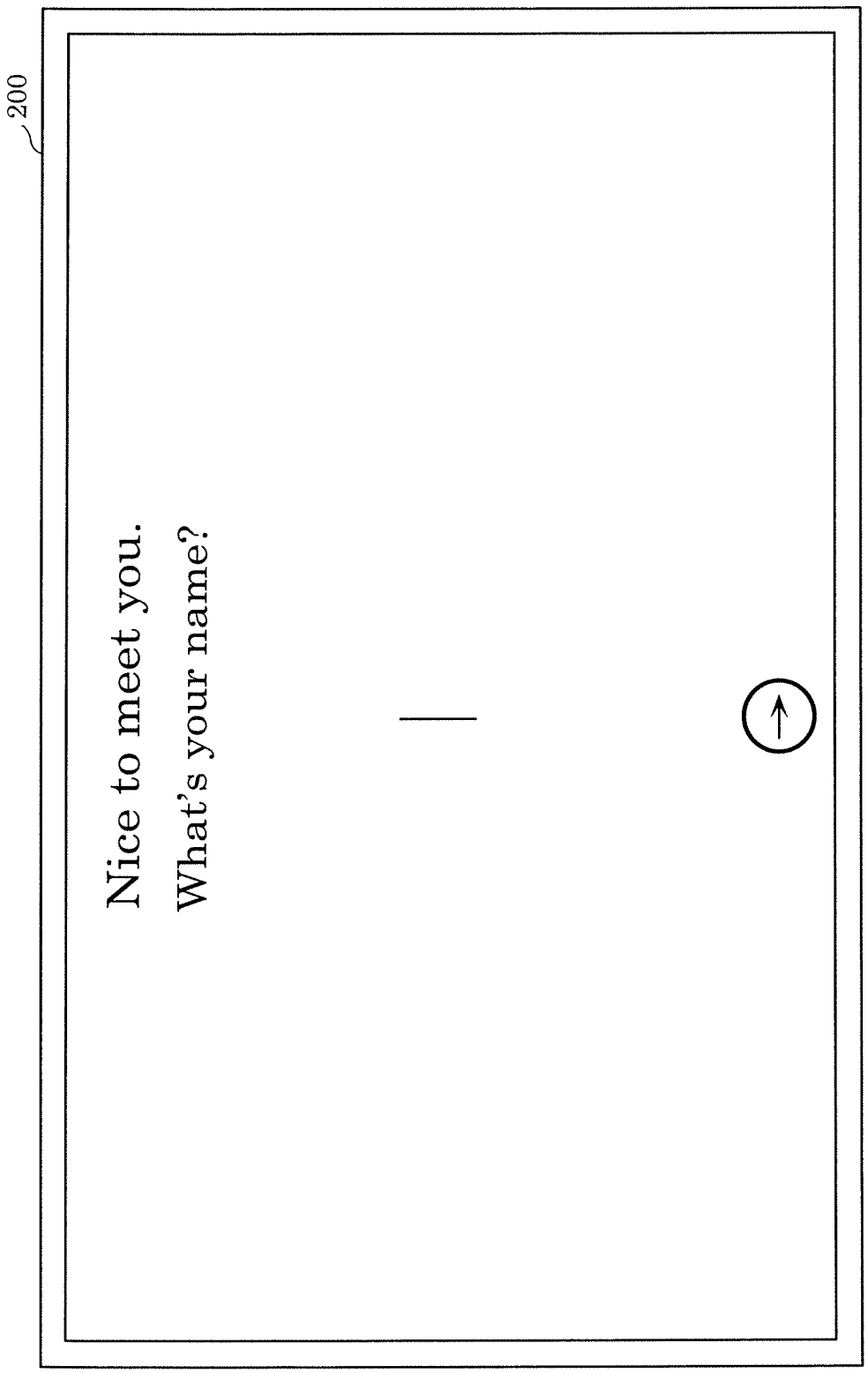
FIG. 8 shows a screen example displayed on a display in Embodiment 1.
Figure 9:
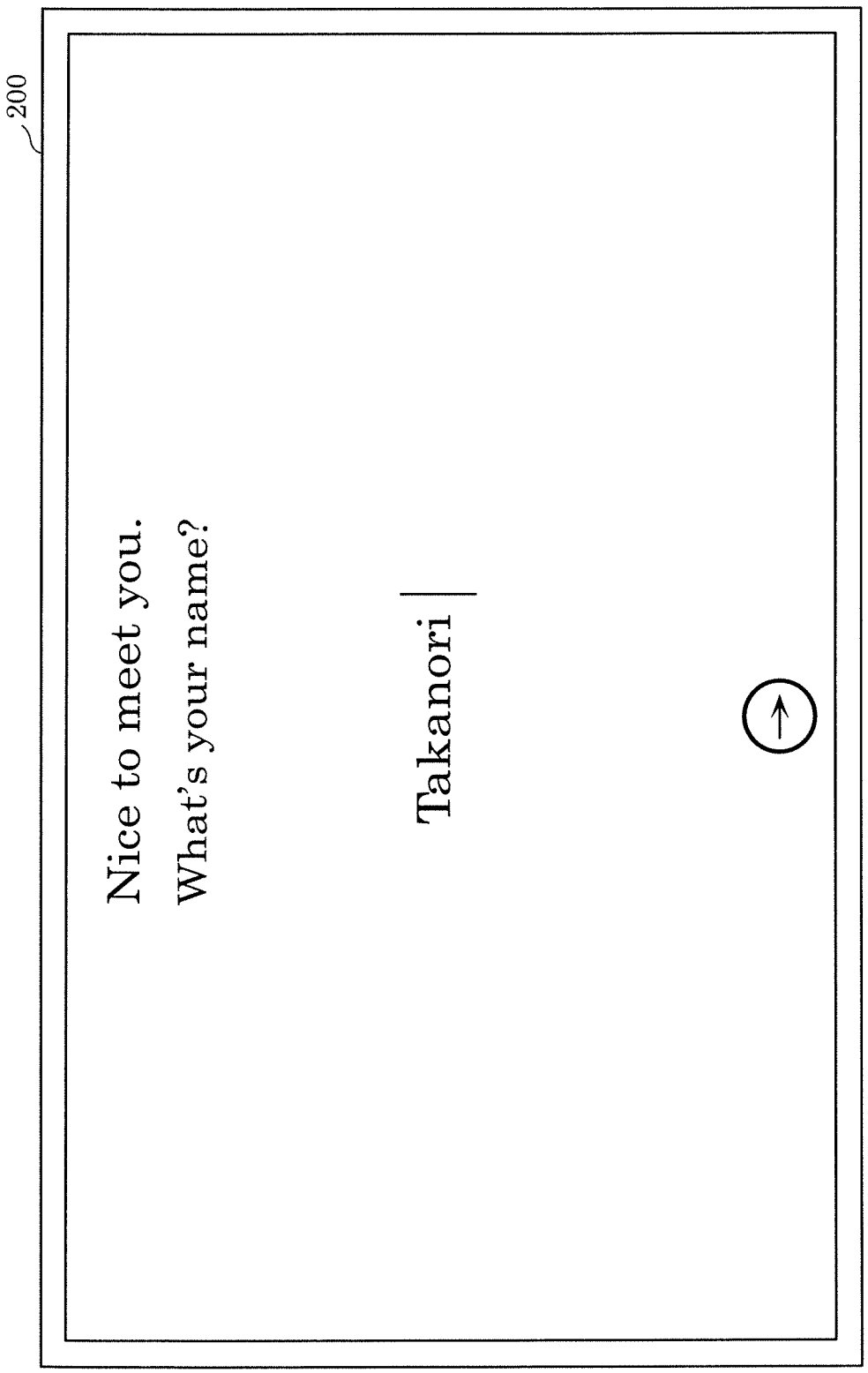
FIG. 9 shows a screen example displayed on the display in Embodiment 1.
Figure 10:
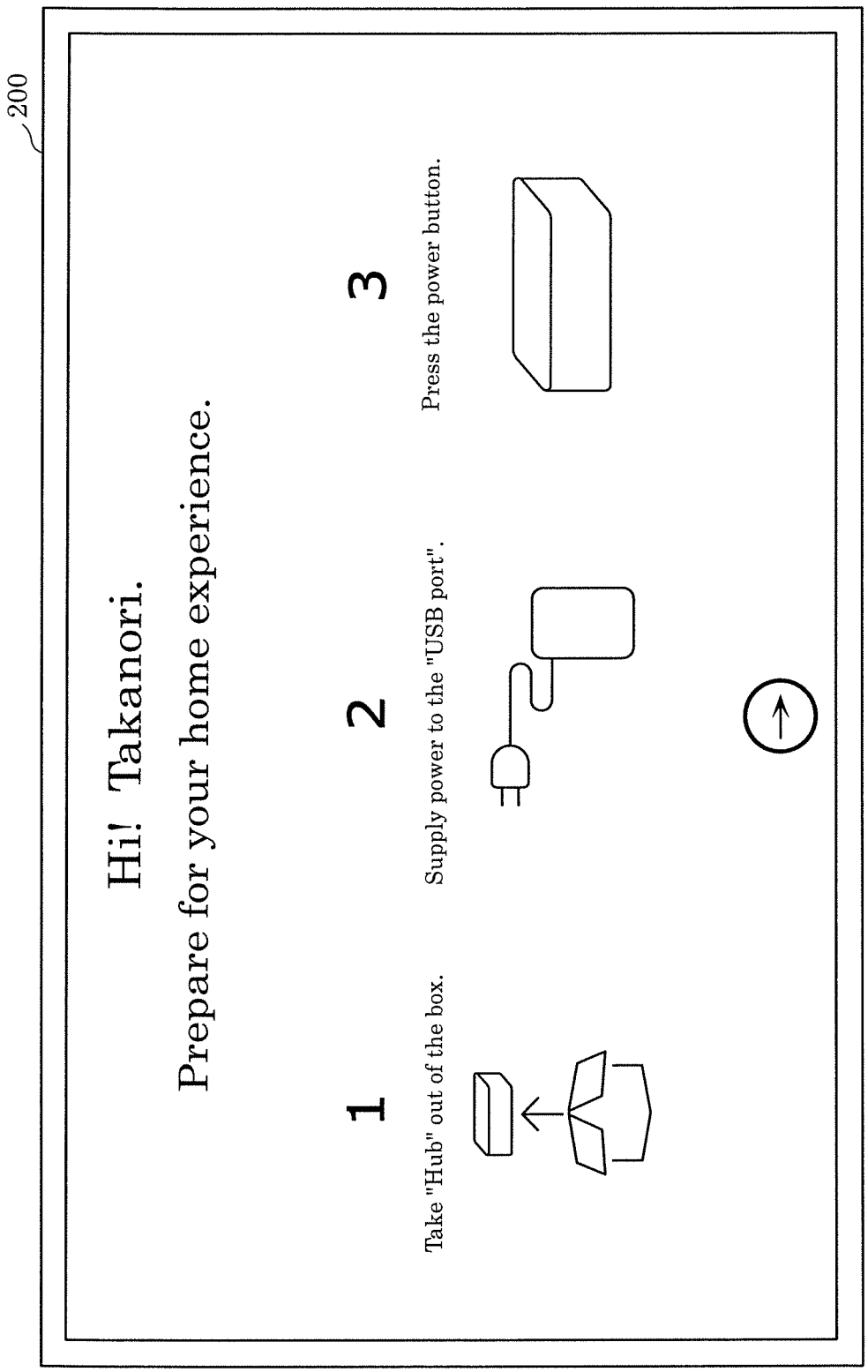
FIG. 10 shows a screen example displayed on the display in Embodiment 1.
Figure 11:
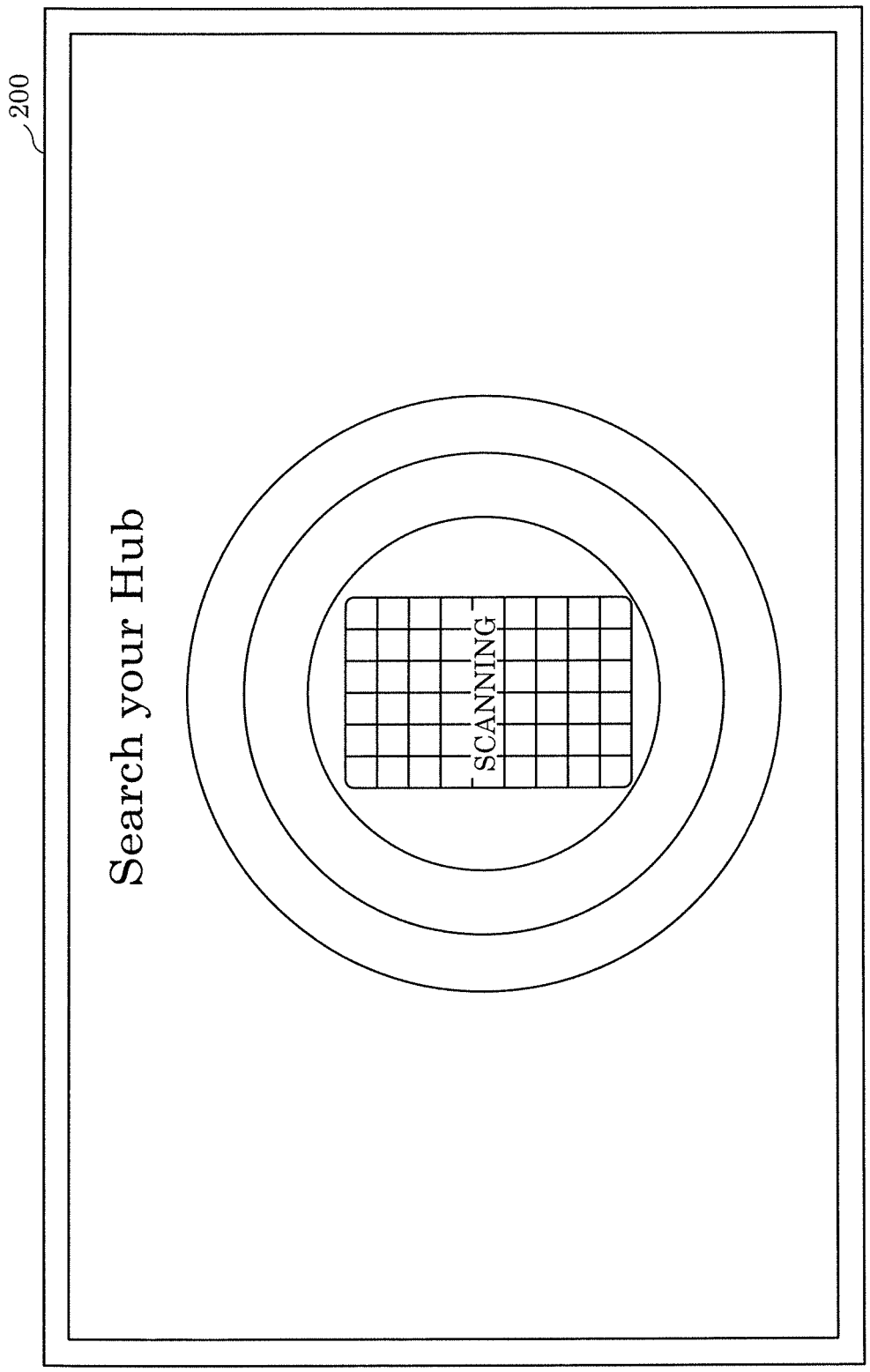
FIG. 11 shows a screen example displayed on the display in Embodiment 1.
Figure 12:
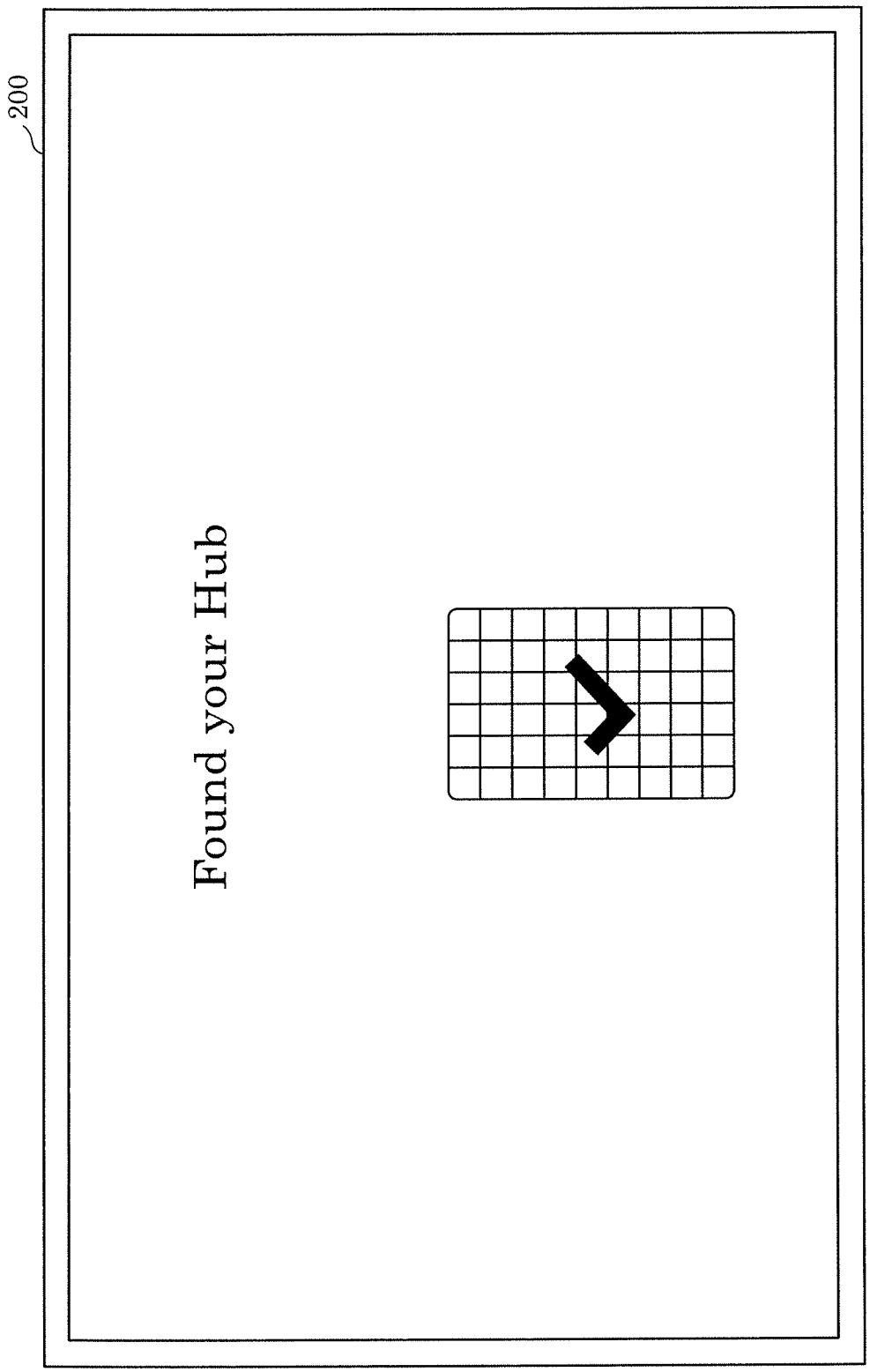
FIG. 12 shows a screen example displayed on the display in Embodiment 1.

In the login screens of FIGS. 8 and 9, a user inputs a user name "Takanori" to log into system 10. After the user logs into system 10, a screen indicating the steps of starting the hub is displayed in FIG. 10. When the hub is started according to the displayed steps, the hub on the network is searched for and detected. At this point, as shown in FIGS. 11 and 12, screens indicating the search and detection are displayed.

Figure 13:
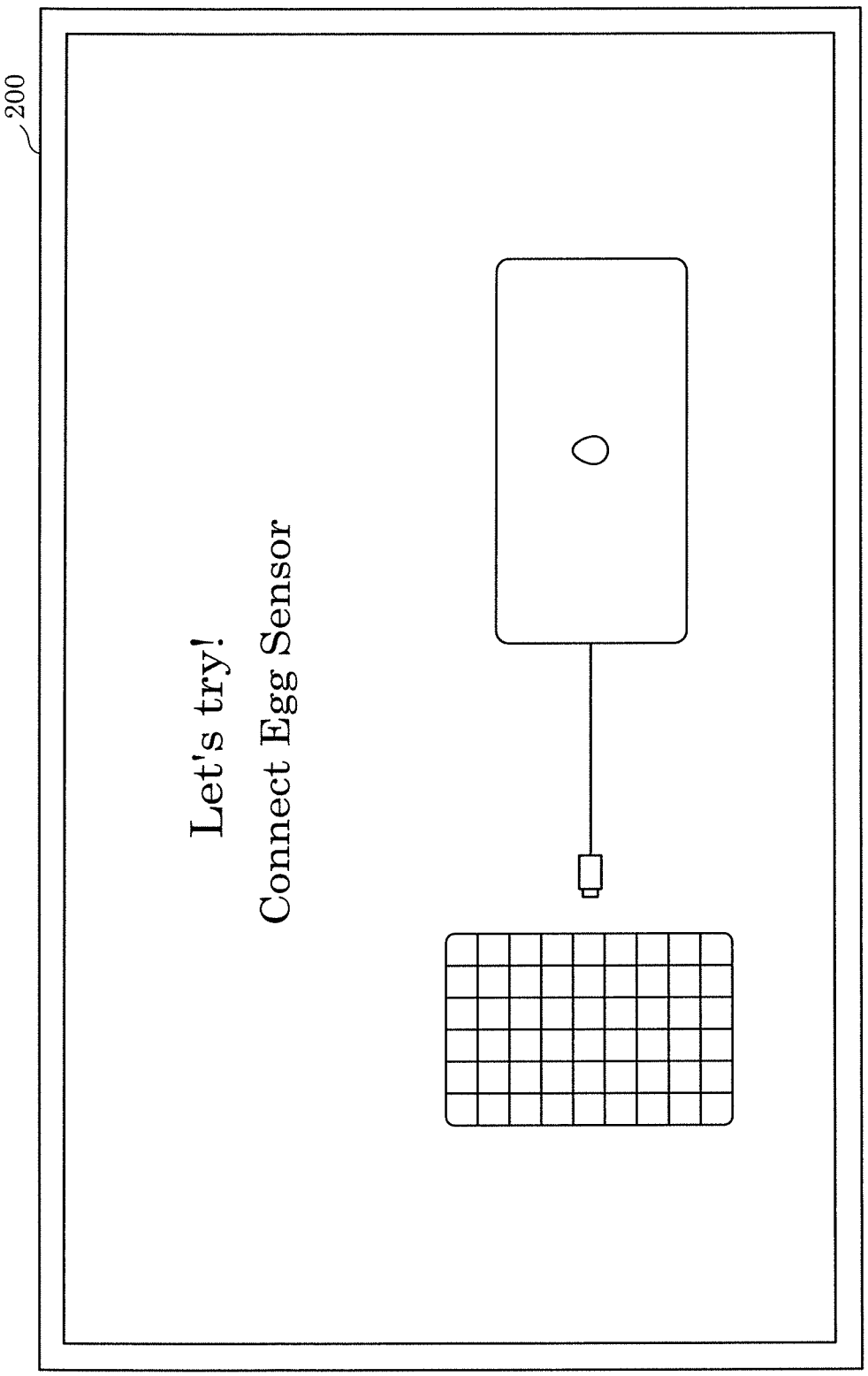
FIG. 13 shows a screen example displayed on the display in Embodiment 1.
Figure 14:
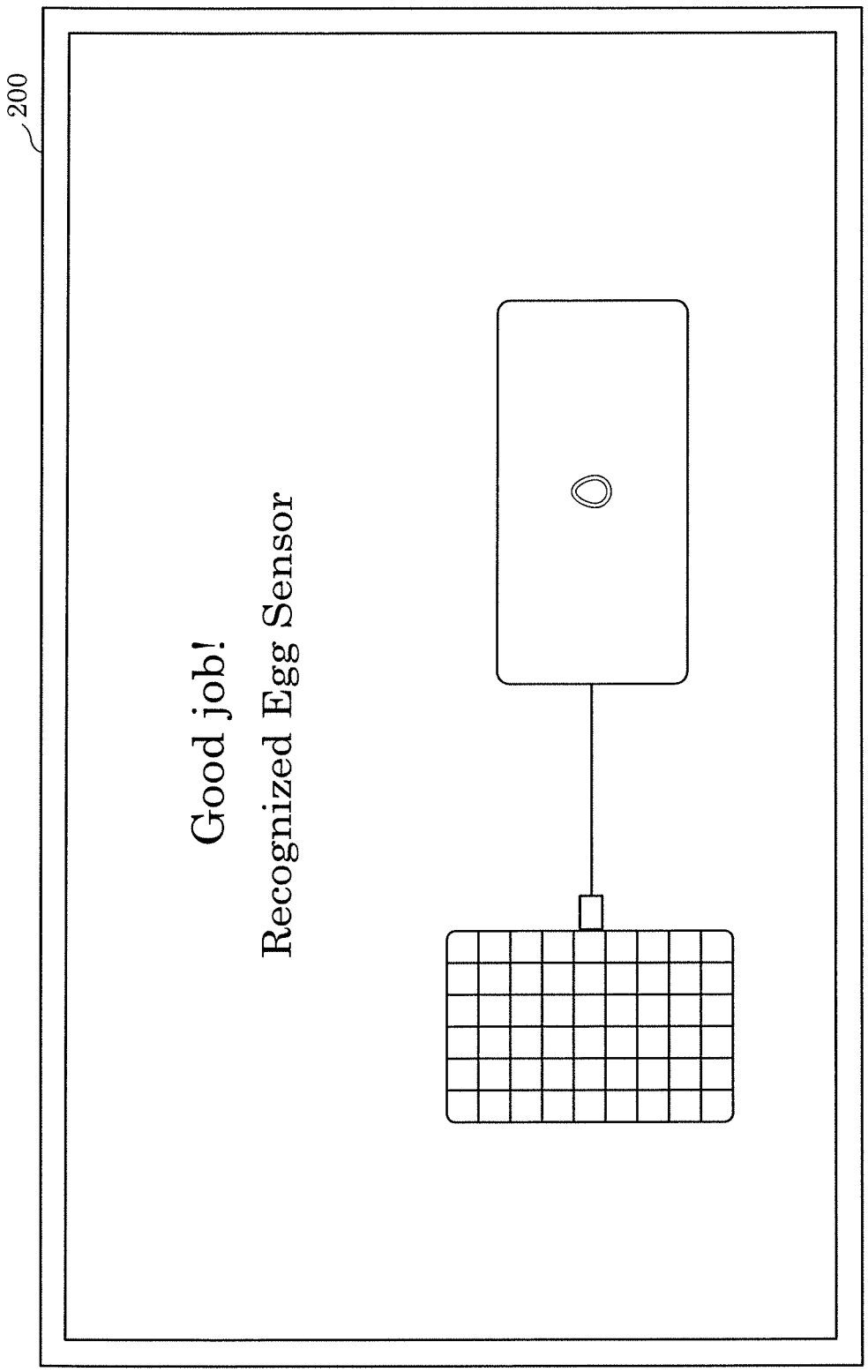
FIG. 14 shows a screen example displayed on the display in Embodiment 1.

Thereafter, in FIG. 13, a screen is displayed to prompt the connection of an egg sensor to the hub. When the user recognizes the connection of the egg sensor to the hub, as shown in FIG. 14, a screen is displayed to indicate the successful recognition of the egg sensor.

Figure 15:
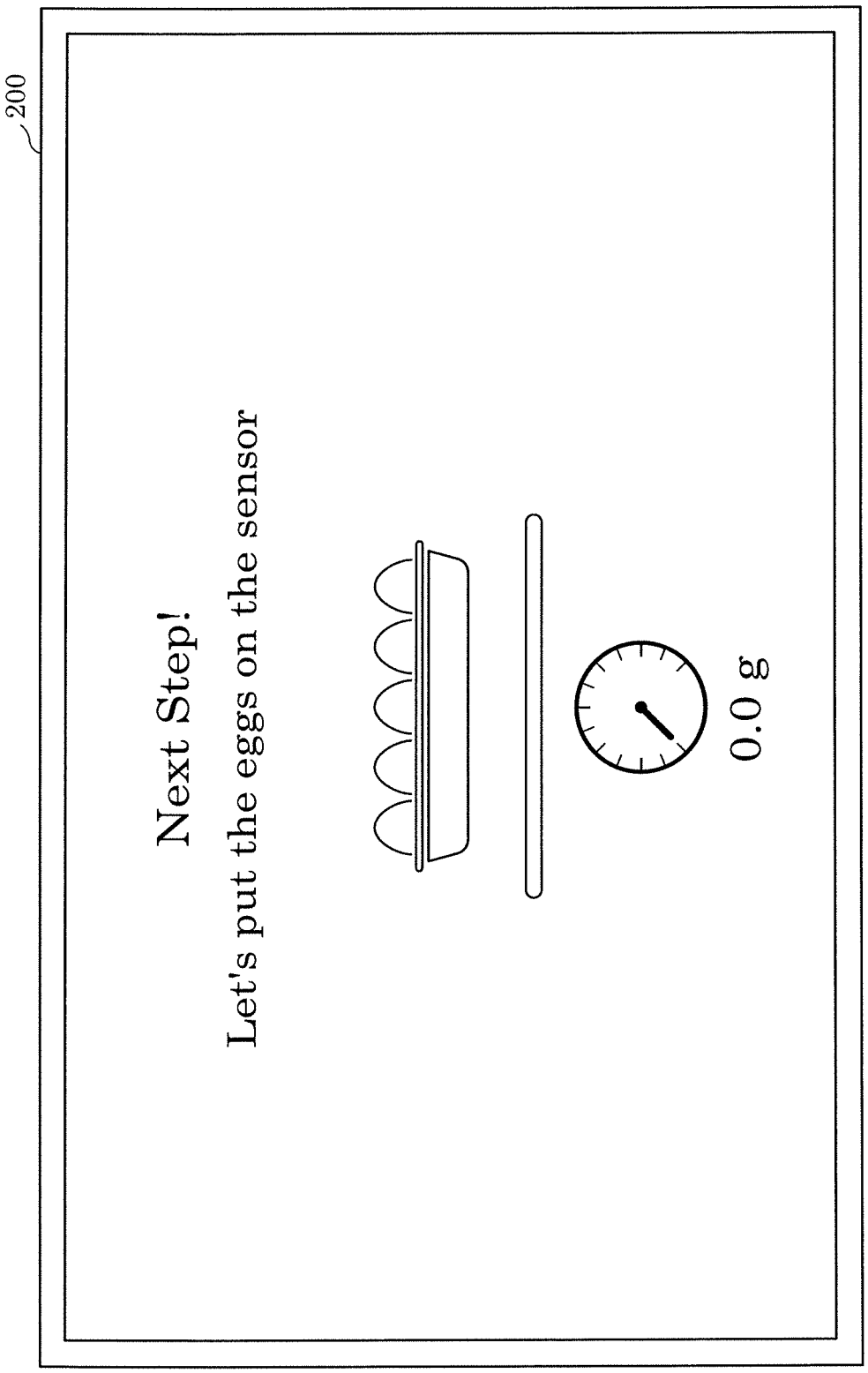
FIG. 15 shows a screen example displayed on the display in Embodiment 1.
Figure 16:
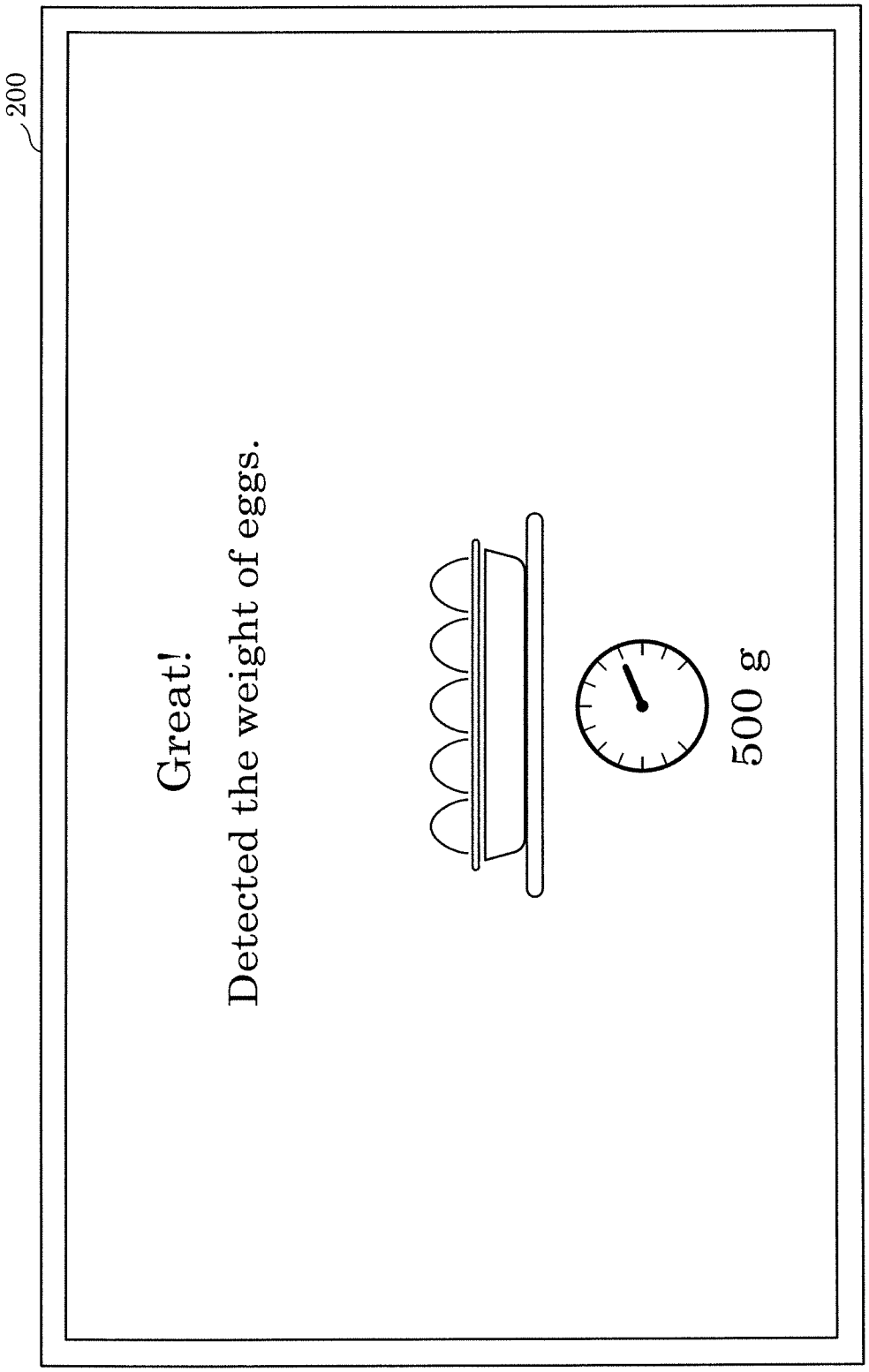
FIG. 16 shows a screen example displayed on the display in Embodiment 1.

Then in FIG. 15, a screen is displayed to prompt the placement of eggs onto the egg sensor. The screen of FIG. 15 is equivalent to the screen displayed in step S200 of FIG. 4. When eggs are put and a weight not lighter than the first predetermined amount (10 g in FIG. 7) is detected, a screen is displayed to indicate the detection of the eggs as shown in FIG. 16. In other words, when the placement of eggs is detected by the egg sensor, the screen in FIG. 16 is displayed. In FIG. 16, "500 g", the weight of the detected eggs, is also displayed.

Figure 17:
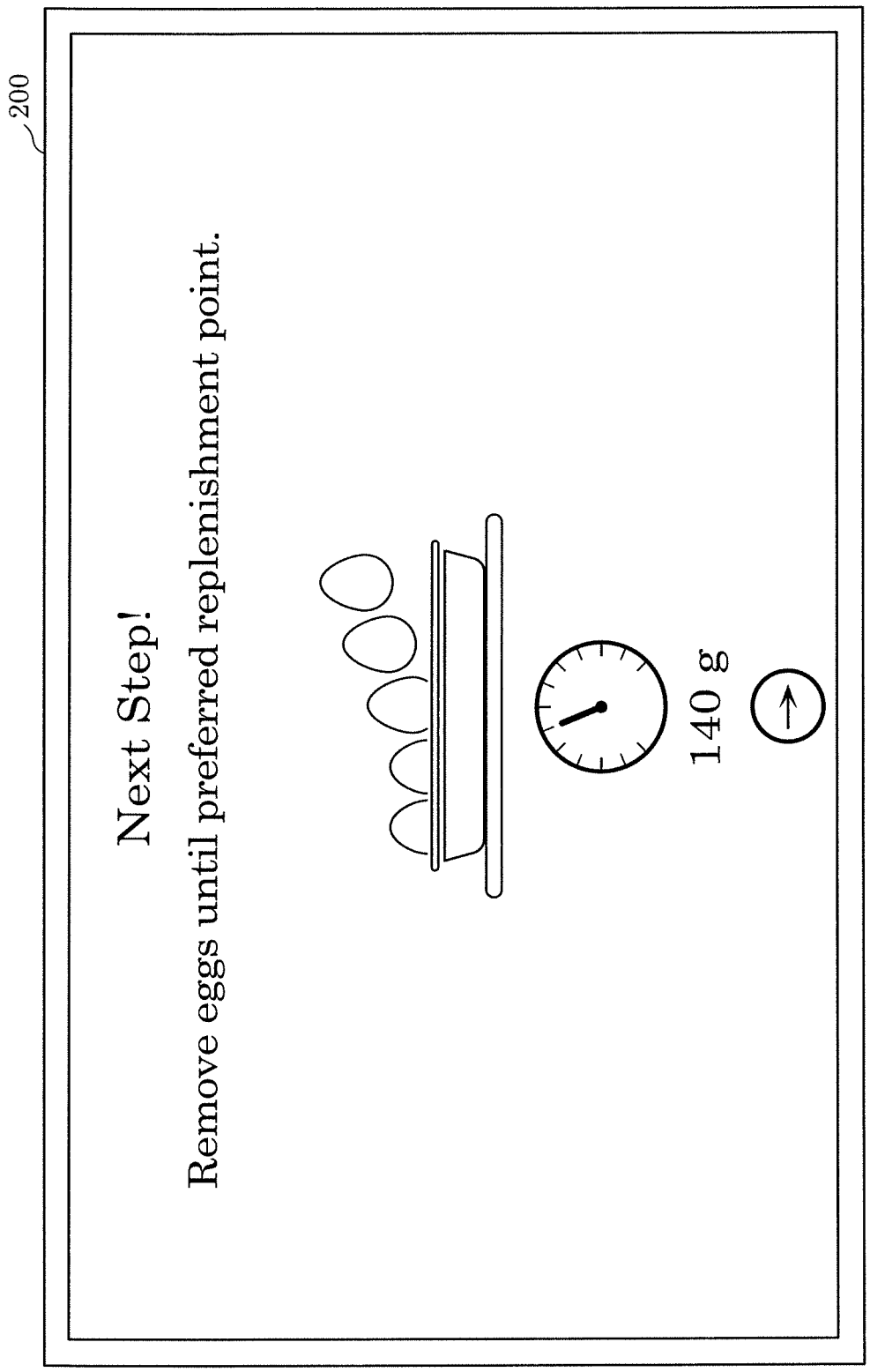
FIG. 17 shows a screen example displayed on the display in Embodiment 1.

After that, in FIG. 17, a screen is displayed to remove the eggs on the egg sensor until the weight decreases to the threshold amount corresponding to the condition of trigger output. The screen of FIG. 17 is equivalent to the first screen displayed in step S400 of FIG. 4. Furthermore, in FIG. 17, the weight of remaining eggs is displayed. When the weight of the eggs is reduced by the second predetermined amount (10 g in FIG. 7) or more, a button (right arrow button) for setting a threshold amount is displayed or enabled. At this point, the user presses the button, allowing the setting of the threshold amount (140 g in FIG. 17).

Figure 18:
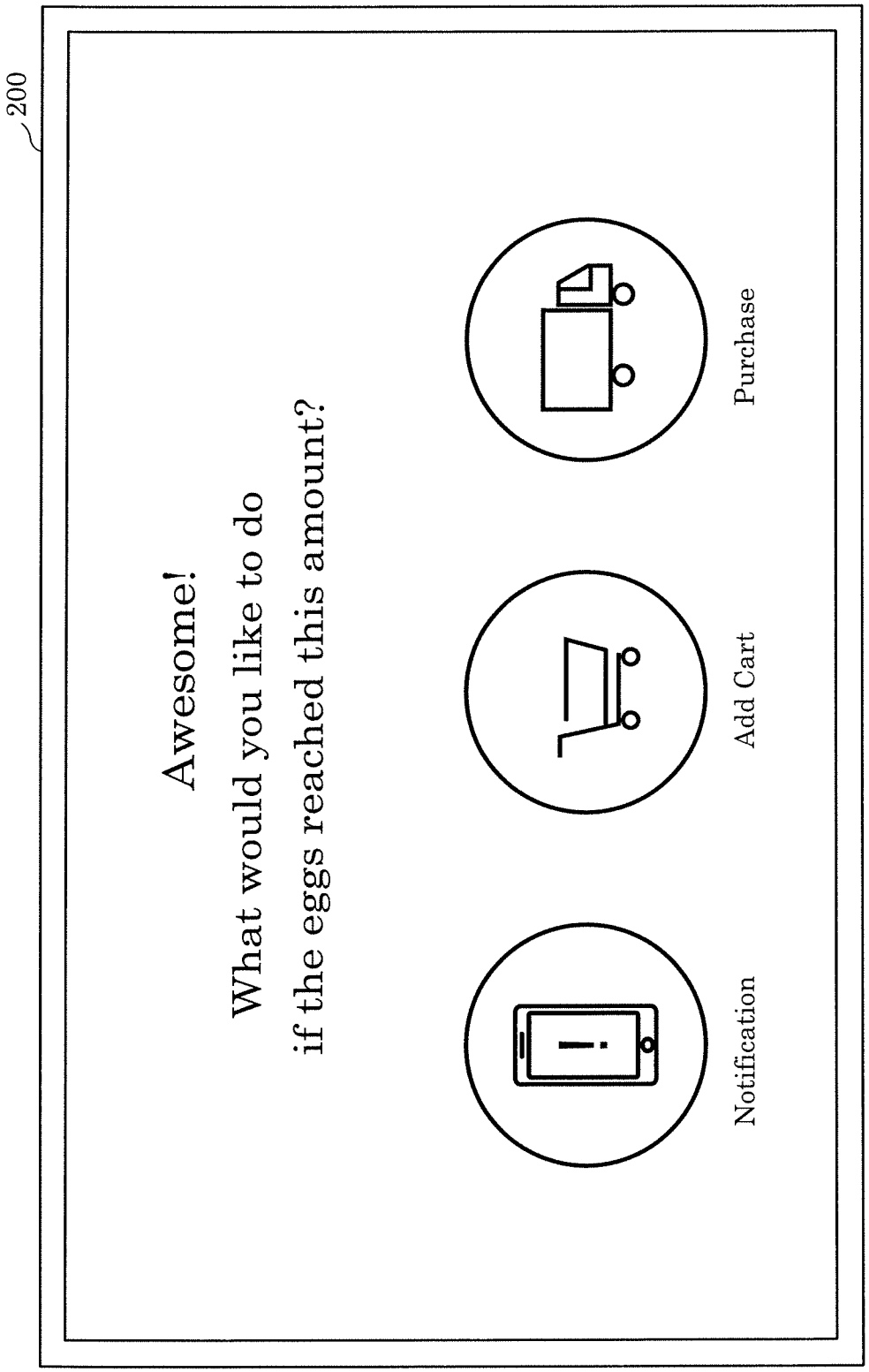
FIG. 18 shows a screen example displayed on the display in Embodiment 1.

After the threshold amount is set, as shown in FIG. 18, a screen is displayed to set the action of processing device 100. Specifically, in FIG. 18, images and character strings for three selectable actions are displayed. The three actions are notification, addition to a cart, and purchase. The screen of FIG. 18 is equivalent to the second screen displayed in step S800 of FIG. 4.

The actions of processing device 100 are not limited to the three selectable actions in FIG. 18. The number of selectable actions is not limited to three as long as at least one action is selected. Another action example is a search. For example, processing device 100 searches for the sales prices of eggs at stores or information on egg coupons provided by stores. The stores include an offline store and an online store.

Figure 19:
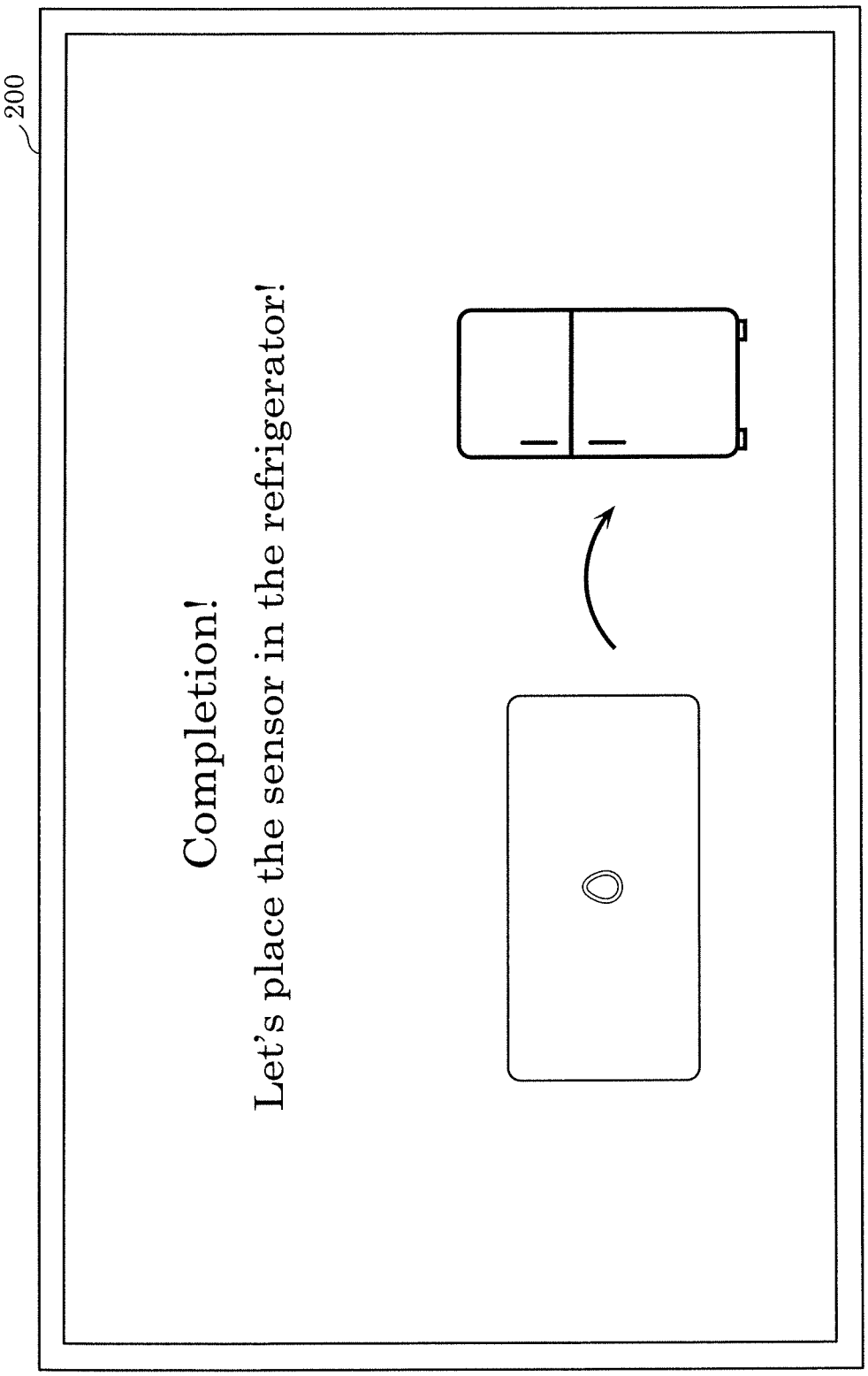
FIG. 19 shows a screen example displayed on the display in Embodiment 1.

When the user selects one of the three actions through the screen of FIG. 18, the output contents which are to be output by processing device 100 upon satisfaction of the condition of trigger output are set based on the selected action. Thereafter, as shown in FIG. 19, a screen is displayed to indicate the completion of the setting of system 10.

[Effects]

As described above, system 10 according to the present embodiment can set the predetermined action and the trigger of the predetermined action in order to perform the predetermined action according to the amount of goods.

At this point, system 10 can set a threshold goods amount corresponding to the condition of trigger output by means of sensor 310. This can reduce the burden of the user in the setting of the threshold amount and improve convenience for the user.

Variation of Embodiment 1

Figure 20:
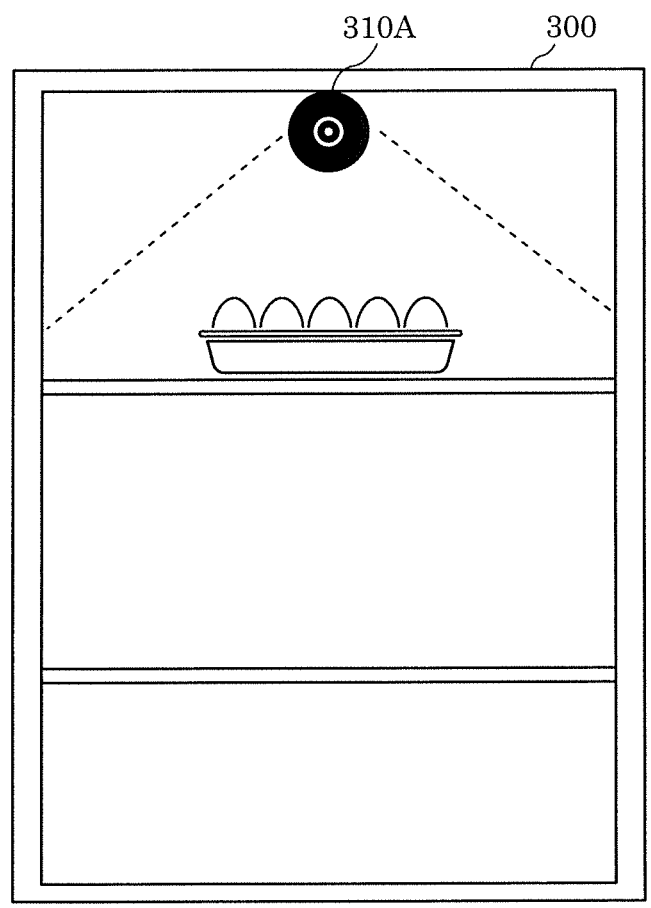
FIG. 20 is a front view illustrating the interior of a refrigerator according to a variation of Embodiment 1.

In the example of the present embodiment, sensor 310 is a weight sensor. The sensor is not limited to a weight sensor. For example, the sensor may be an image sensor as shown in FIG. 20. FIG. 20 illustrates sensor 310A in a variation of Embodiment 1.

Sensor 310A is an image sensor that captures an image of goods in refrigerator 300. For example, sensor 310A captures an image of goods in refrigerator 300 when the door of refrigerator 300 is opened. The captured image of goods is transmitted to processing device 100. Processor 110 of processing device 100 acquires the amount of goods based on the image of goods. For example, processor 110 counts the number of goods by recognizing the goods in the image.

FIG. 21 shows an example of the time series of the amount of goods in a system according to the variation of Embodiment 1. In FIG. 21, as an amount of goods, the number of goods is used instead of a weight. Also in this case, a threshold amount corresponding to the condition of trigger output can be set by removing some of the goods in refrigerator 300 according to a screen displayed on display 240.

For example, in a plurality of images captured at different times, processor 110 may detect goods returned into refrigerator 300 after being removed from refrigerator 300 and acquire information on the amount of goods by reducing the amount of goods by a predetermined amount. In this case, memory 120 may store information on a predetermined amount for each item of goods.

FIG. 22 shows information on predetermined amounts in the variation of Embodiment 1. The information on predetermined amounts indicates item IDs, the amount of usage at each time, and whether goods are returned or not. In this case, the amount of usage at each time corresponds to a predetermined amount. Moreover, whether goods are returned or not indicates whether the goods are returned into refrigerator 300 after being used. For example, a used beverage bottle is returned into refrigerator 300 and thus is defined as "returned", whereas a used egg is not returned into refrigerator 300 and thus is defined as "not returned".

FIG. 22 shows that a user consumes 20 g of goods identified by an item ID "002" at each time and the used item is returned into refrigerator 300. Thus, upon detection of the return of the goods identified by the item ID "002" in refrigerator 300, the amount is reduced by 30 g.

Figure 23:
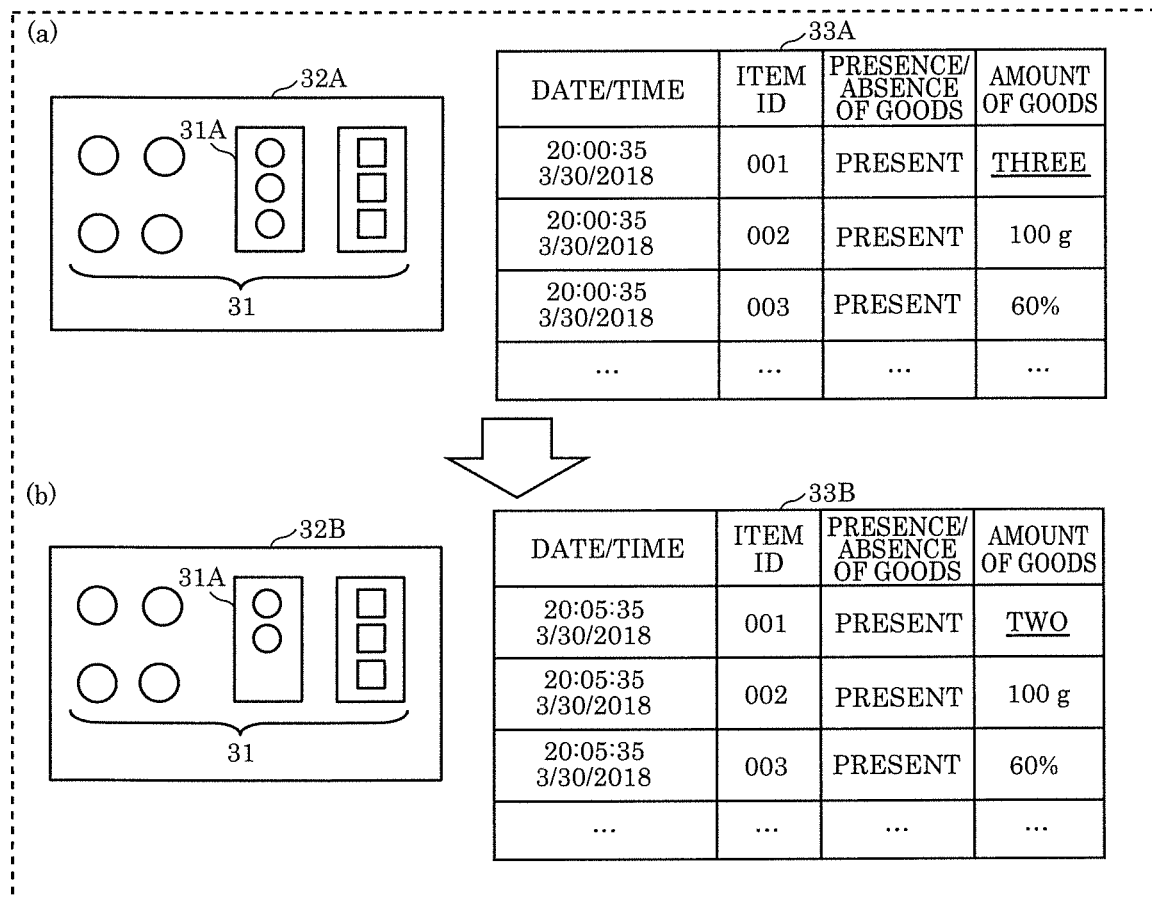
FIG. 23 shows an example of information on the amount of goods in the variation of Embodiment 1.
Figure 24:
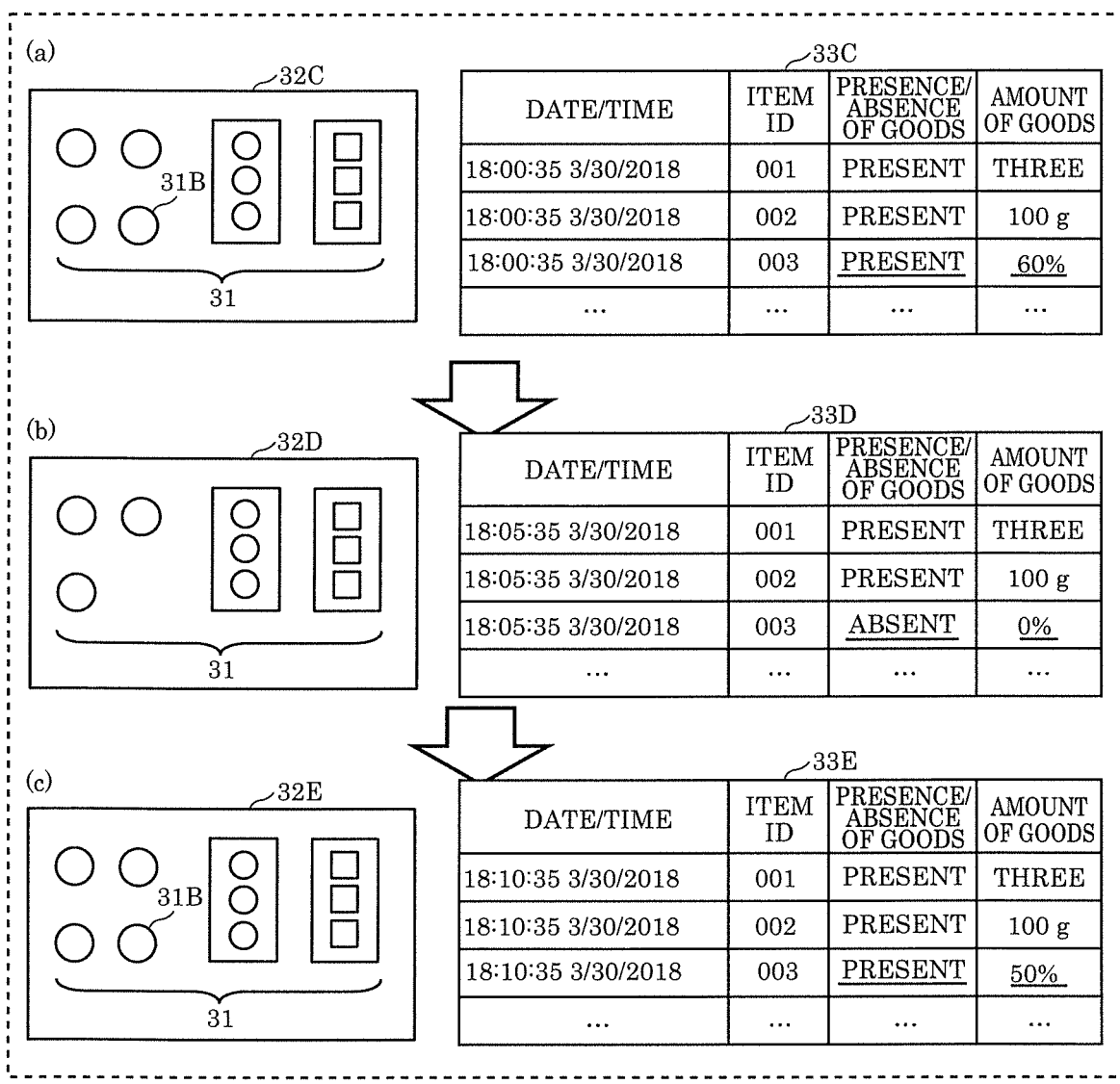
FIG. 24 shows an example of information on the amount of goods in the variation of Embodiment 1.

Referring to FIGS. 23 and 24, specific examples of a method of acquiring the amount of goods from an image captured by sensor 310A will be described below. FIGS. 23 and 24 show the specific examples of the acquisition of information on the amounts of goods in the variation of Embodiment 1.

FIG. 23 shows the acquisition of information on the amounts of goods of an item ID "001" that is defined as "not returned". (a) in FIG. 23 shows first image 32A and first goods amount information 33A at a first date and time (3/30/2018, 20:00:35). (b) in FIG. 23 shows second image 32B and second goods amount information 33B at a second date and time (3/30/2018, 20:05:35) after the first date and time.

Goods 31A in first image 32A and second image 32B are identified by the item ID "001". Refrigerator 300 or processing device 100 can derive "three" as the amount of goods 31A by analyzing first image 32A. Moreover, refrigerator 300 or processing device 100 can derive "two" as the amount of goods 31A by analyzing second image 32B. As a result, in second goods amount information 33B, the amount of goods of the item ID "001" is updated from "three" to "two".

FIG. 24 shows the acquisition of information on the amount of goods of an item ID "003" that is defined as "returned". (a) in FIG. 24 shows first image 32C and first goods amount information 33C at a first date and time (3/30/2018, 18:00:35). (b) in FIG. 24 shows second image 32D and second goods amount information 33D at a second date and time (3/30/2018, 18:05:35) after the first date and time. (c) in FIG. 24 shows third image 32E and third goods amount information 33E at a third date and time (3/30/2018, 18:10:35) after the second date and time.

Goods 31B in first image 32C, second image 32D, and third image 32E are identified by the item ID "003". In first goods amount information 33C, "60%" has been already obtained as the amount of goods 31B. In this case, when second image 32D is captured, sensor 310A analyzes second image 32D and recognizes the absence of goods 31B in refrigerator 300. Thereafter, in second goods amount information 33D, sensor 310A updates the item ID "003" to "absent" and an amount of goods "0%". Subsequently, when third image 32E is captured, sensor 310A analyzes third image 32E and recognizes the return of goods 31B into refrigerator 300. Furthermore, in third goods amount information 33E, sensor 310A updates the item ID "003" to "present" and an amount of goods "50%". The amount of goods "50%" is the result of subtracting the amount of usage "10%" at each time in FIG. 22 from the amount of goods "60%" in first goods amount information 33C.

Embodiment 2

Embodiment 2 will be described below. The present embodiment is mainly different from Embodiment 1 in that a sensor usable for any goods is used instead of a sensor for a specific item. Regarding system 10 of the present embodiment, differences from Embodiment 1 will be mainly discussed below.

The system configuration of the present embodiment is similar to that of Embodiment 1 and thus the illustration and explanation thereof are omitted.

[Operations of System 10]

Figure 25:
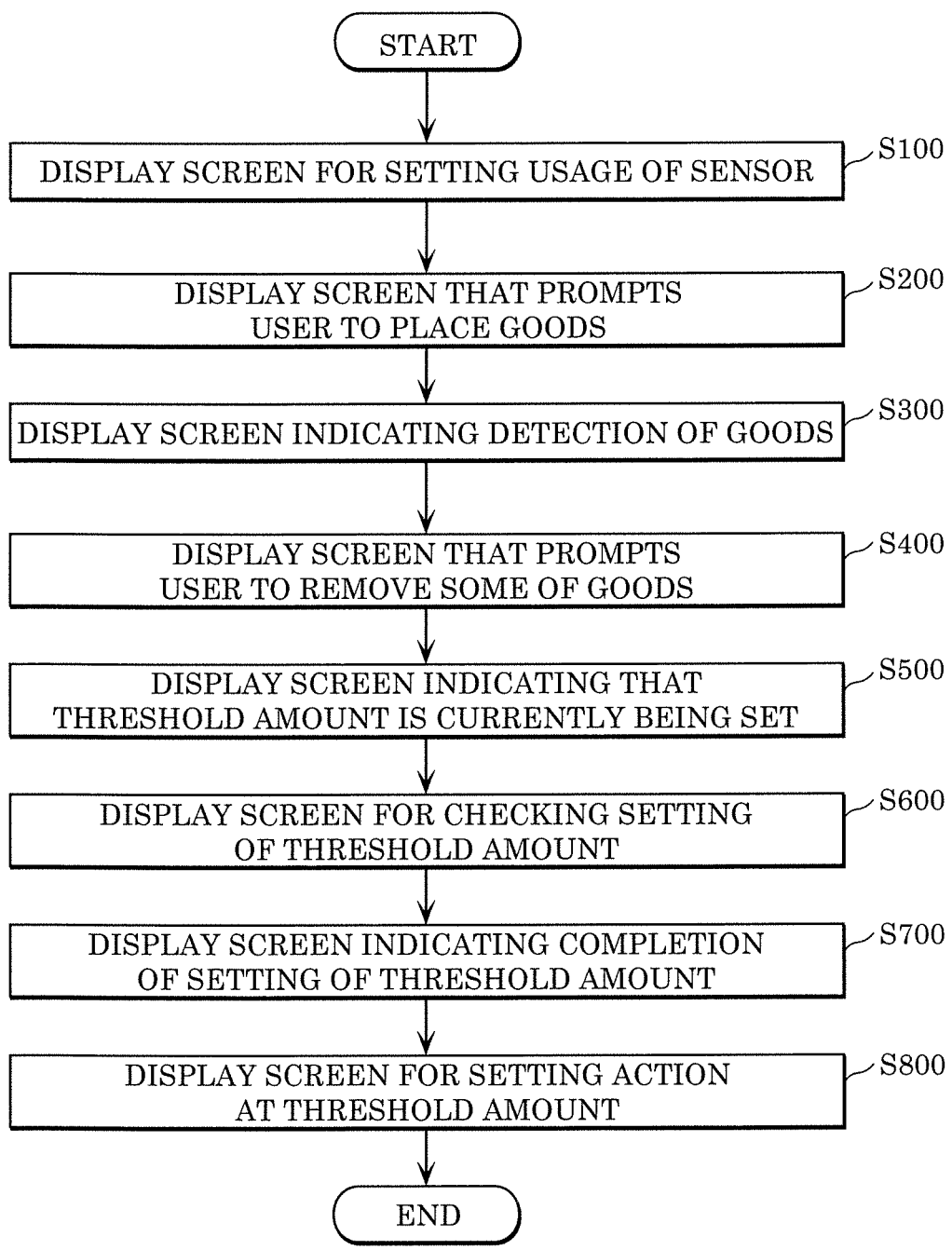
FIG. 25 is a flowchart of processing for setting of a system according to Embodiment 2.
Figure 26:
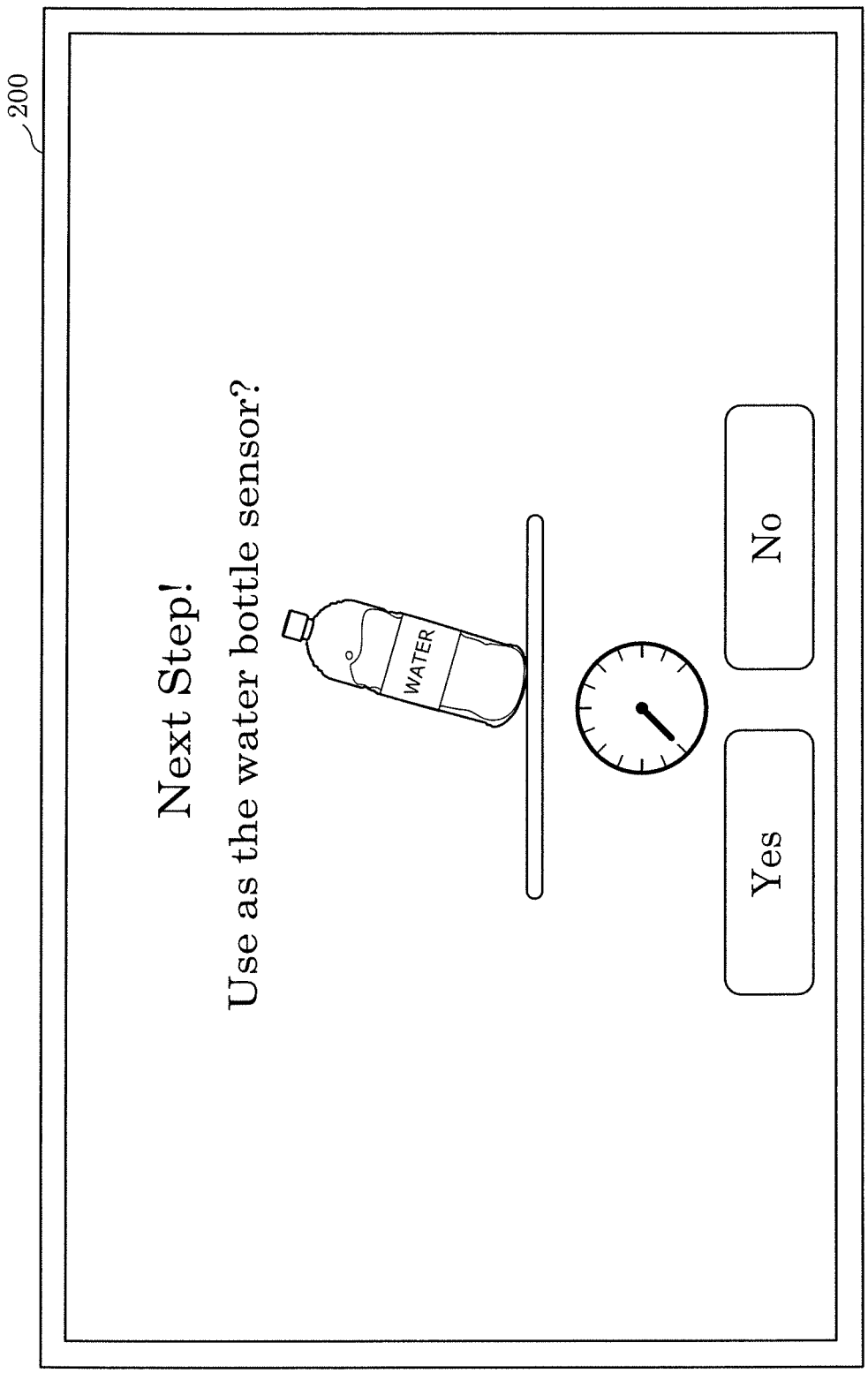
FIG. 26 shows a screen example displayed on a display in Embodiment 2.
Figure 27:
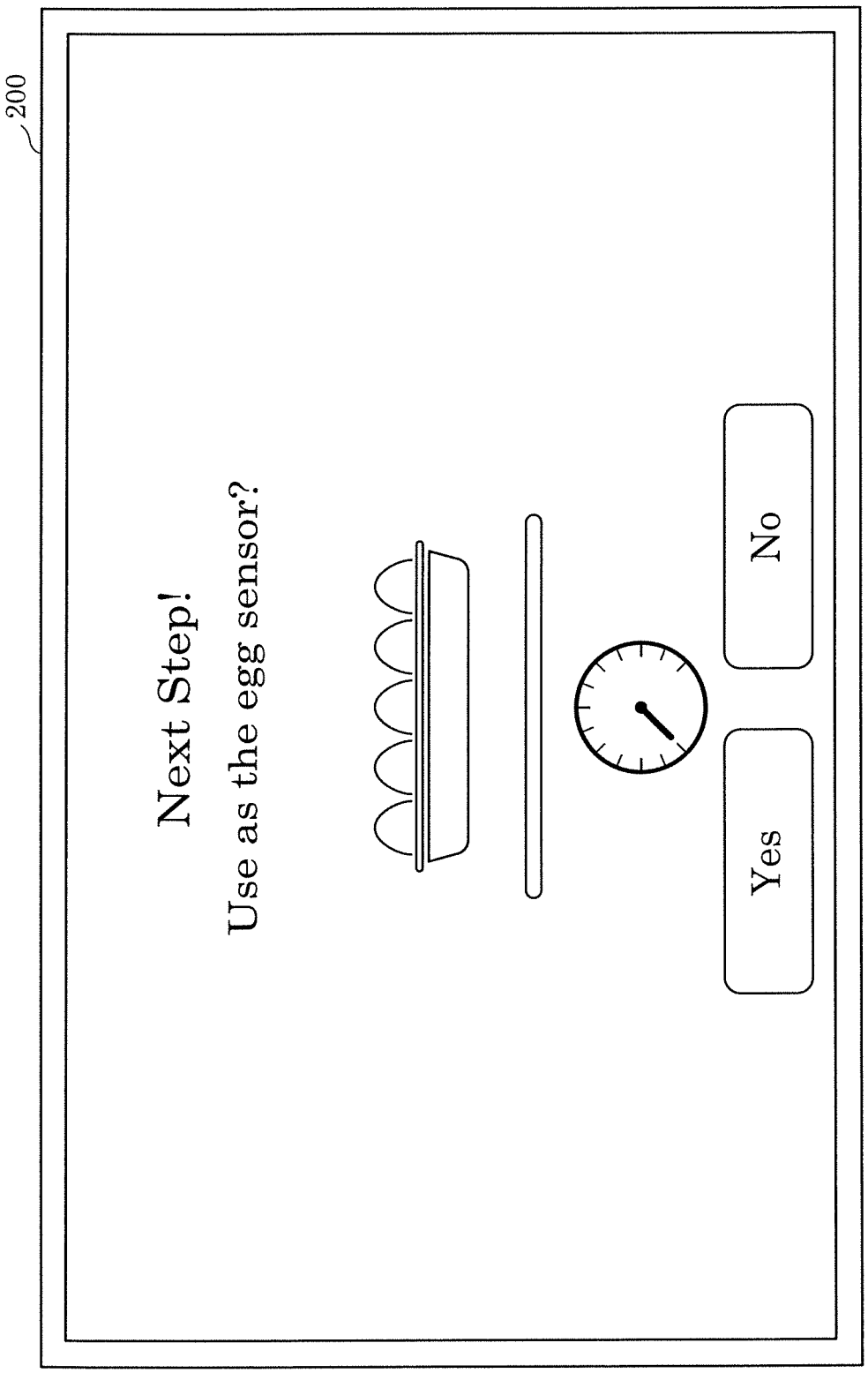
FIG. 27 shows a screen example displayed on the display in Embodiment 2.
Figure 28:
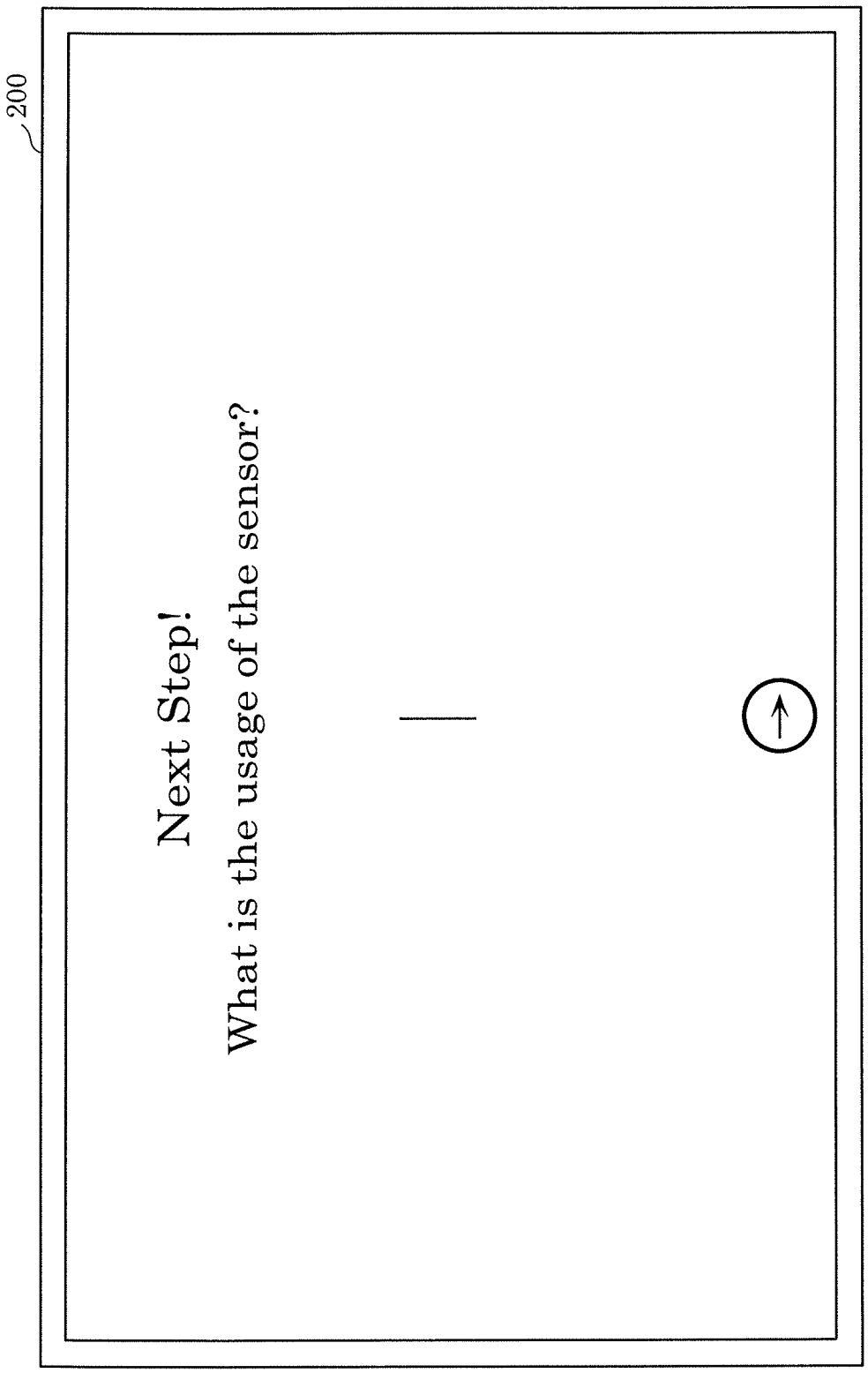
FIG. 28 shows a screen example displayed on the display in Embodiment 2.

Referring to FIGS. 25 to 28, the processing of system 10 according to the present embodiment will be described below. FIG. 25 is a flowchart of processing for the setting of system 10 according to Embodiment 2. FIGS. 26 to 28 show screen examples displayed on display 240 in Embodiment 2.

[Step S100]

In the present embodiment, processor 110 of processing device 100 first displays a screen on display 240. The screen is displayed to set the usage of sensor 310.

Specifically, based on the product purchase history of a user, processor 110 may estimate the usage of sensor 310 and display a screen (e.g., FIG. 26) that indicates the estimated usage as a candidate. At this point, processor 110 may estimate that the usage of sensor 310 is the detection of an amount of goods corresponding to a product purchased with sensor 310. For example, processor 110 may estimate that the usage of sensor 310 is the detection of an amount of goods corresponding to a finally purchased product.

FIG. 26 shows a screen displayed when the detection of a quantity of water is estimated as usage of sensor 310. In this case, the detection of a quantity of water is set as usage of sensor 310 by pressing a Yes button. If a No button is pressed, a screen (e.g., FIG. 27) for setting another usage is displayed. Another usage may be the detection of the amount of predetermined goods.

FIG. 27 shows a screen displayed when the predetermined goods are eggs. In this case, the detection of the amount of eggs is set as usage of sensor 310 by pressing a Yes button. If a No button is pressed, a screen (e.g., FIG. 28) is displayed to allow a free input of, for example, the usage of sensor 310.

In FIG. 28, a user freely inputs a name of goods and the detection of the amount of inputted goods is set as the usage of sensor 310.

Switching of screens for setting the usage of sensor 310 is not limited to FIGS. 26 to 28. For example, the screen of FIG. 27 may be displayed prior to the screen of FIG. 26. Specifically, the screen that indicates the detection of the amount of predetermined goods as a candidate of the usage of sensor 310 may be displayed before the screen based on a product purchase history. Alternatively, only the screen of FIG. 28 may be displayed without the screens of FIGS. 26 and 27.

Processing in steps S200 to S800 is identical to that of Embodiment 1 and thus the explanation thereof is omitted. After the display of the second screen in step S800, the output contents which are to be output by processing device 100 upon satisfaction of the condition of trigger output are set based on the usage which has been set.

The order of step S100 for the display of the screen for setting the usage is not limited to the order of FIG. 25. For example, step S100 may be performed between the display of the screen that indicates the detection of an amount of goods (S300) and the display of the screen that prompts the removal of some goods (S400). Alternatively, step S100 may be performed after the display of the screen that indicates the completion of the setting of a threshold amount (S700).

[Effects]

As described above, system 10 according to the present embodiment can set the usage of sensor 310. This can improve the versatility of system 10. Moreover, the usage of sensor 310 can be estimated based on a product purchased with sensor 310 or a finally purchased product, so that the usage of sensor 310 can be smoothly set. Furthermore, the burden of the user can be reduced in the setting of the usage of sensor 310, improving convenience for the user. Alternatively, processor 110 may acquire information on goods purchased by the user from a retail store or an online store and acquire the product purchase history of the user based on the acquired goods information. For example, the information on goods purchased by the user may be acquired from information on points provided for the user when goods are purchased from a retail store or an online store.

Embodiment 3

Embodiment 3 will be described below. The present embodiment is different from Embodiment 1 in that if goods (hereinafter, will be referred to as goods not to be detected) other than goods to be detected are placed in the detection area of sensor 310, a notification is made to prompt a user to move the goods. Regarding system 10 of the present embodiment, differences from Embodiment 1 will be mainly discussed below.

The system configuration of the present embodiment is similar to that of Embodiment 1 and thus the illustration and explanation thereof are omitted.

[Operations of System 10]

Figure 29:
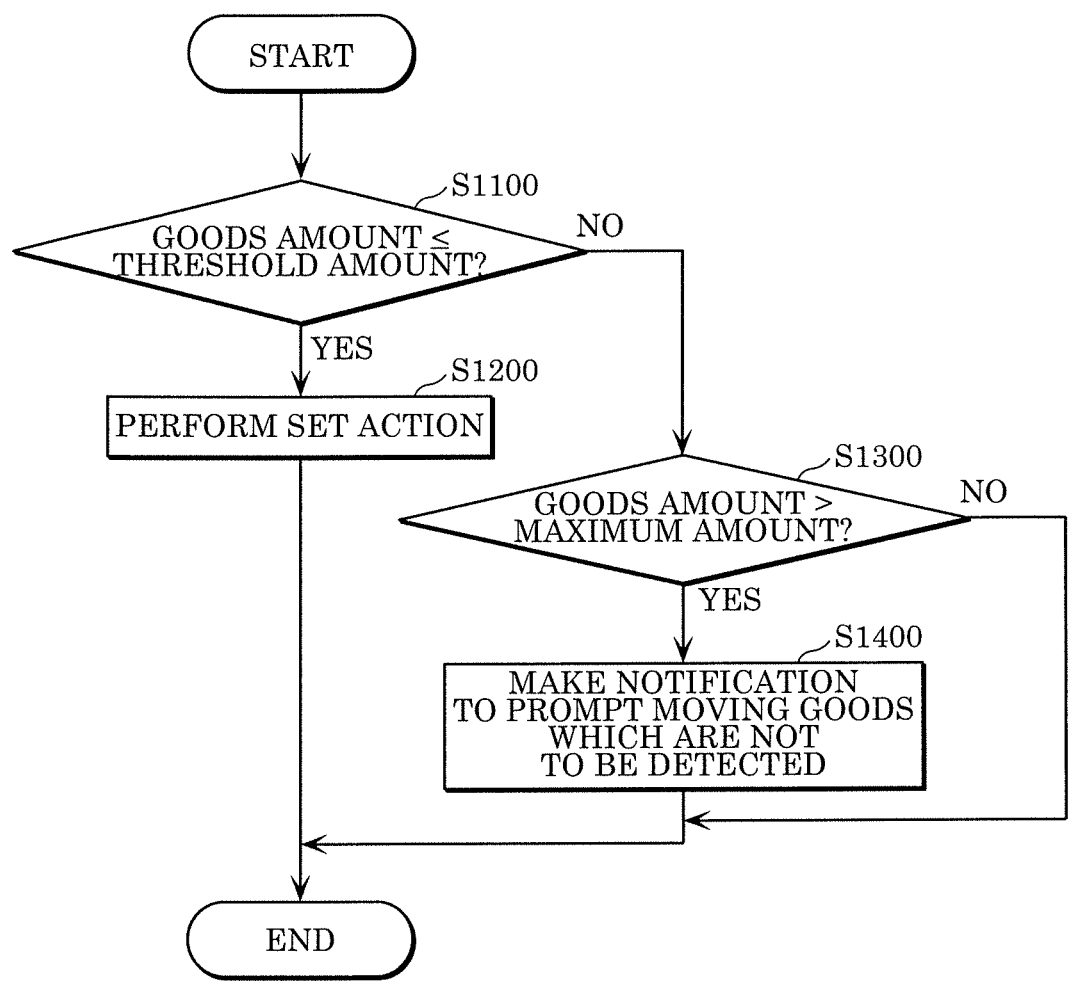
FIG. 29 is a flowchart of processing for actions of a system according to Embodiment 3.
Figure 30:
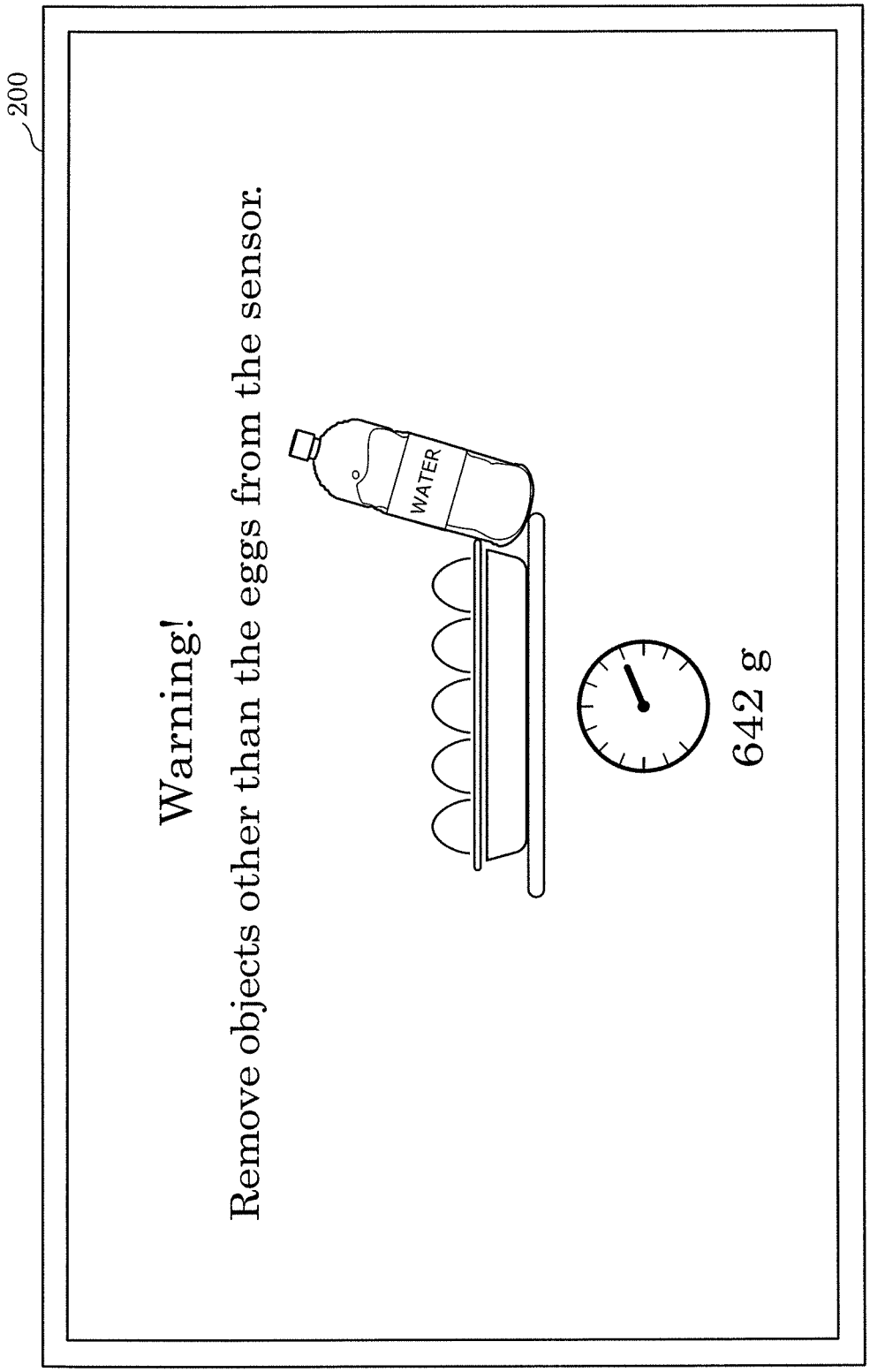
FIG. 30 shows an example of a screen displayed on a display according to Embodiment 3.

Referring to FIGS. 29 and 30, the processing of system 10 according to the present embodiment will be described below. FIG. 29 is a flowchart of processing for the actions of system 10 according to Embodiment 3. FIG. 30 shows an example of a screen displayed on display 240 according to Embodiment 3.

[Step S1300]

If it is determined that the amount of goods is larger than a threshold amount (No at step S1100), processor 110 determines whether an amount of goods detected by sensor 310 is larger than a maximum amount. In this case, if it is determined that the amount of goods is not larger than the maximum amount (No at S1300), the processing is terminated.

The maximum amount is the maximum value of an amount of goods accepted in detection by sensor 310. The maximum amount may be, for example, an amount of goods first detected by sensor 310. Specifically, in the example of FIG. 6, "500 g" detected between step S200 and step S300 can be used as the maximum amount. The maximum amount is not limited to an amount of goods detected by sensor 310. For example, an amount indicated on a goods container or a label may be used as the maximum amount.

[Step S1400]

If it is determined that the amount of goods is larger than the maximum amount (Yes at step S1300), processor 110 makes a notification to prompt moving of goods not to be detected from the detection area of sensor 310. For example, processor 110 displays a screen (e.g., FIG. 30) on display 240. The screen informs a user that goods not to be detected may be placed in the detection area of sensor 310 and prompts the user to move the goods. It is not always necessary to provide the notification through display 240. Only sound may be outputted instead.

[Effects]

As described above, if an amount detected by sensor 310 is larger than the maximum amount, system 10 according to the present embodiment can prompt the user to move, from the detection area of sensor 310, goods not to be detected other than goods to be detected. For example, if refrigerator 300 stores a large number of goods, goods to be detected and goods not to be detected may be placed in the detection area of sensor 310. In this case, the present embodiment can avoid incorrect detection of the amount of goods to be detected.

Embodiment 4

Embodiment 4 will be described below. The present embodiment is mainly different from Embodiment 1 in that the action of processing device 100 can be updated after being set. Regarding system 10 of the present embodiment, differences from Embodiment 1 will be mainly discussed below. The system configuration of the present embodiment is similar to that of Embodiment 1 and thus the illustration and explanation thereof are omitted.

[Operations of System 10]

Figure 31:
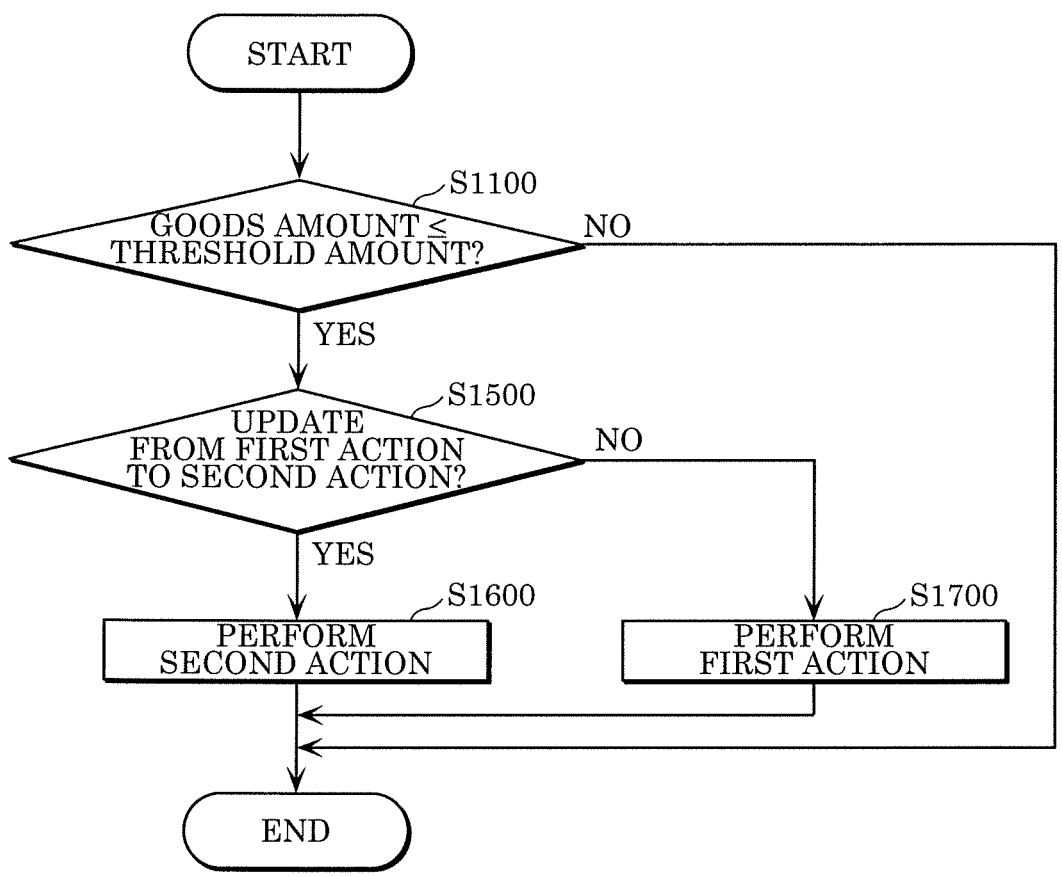
FIG. 31 is a flowchart of processing for actions of a system according to Embodiment 4.
Figure 32:
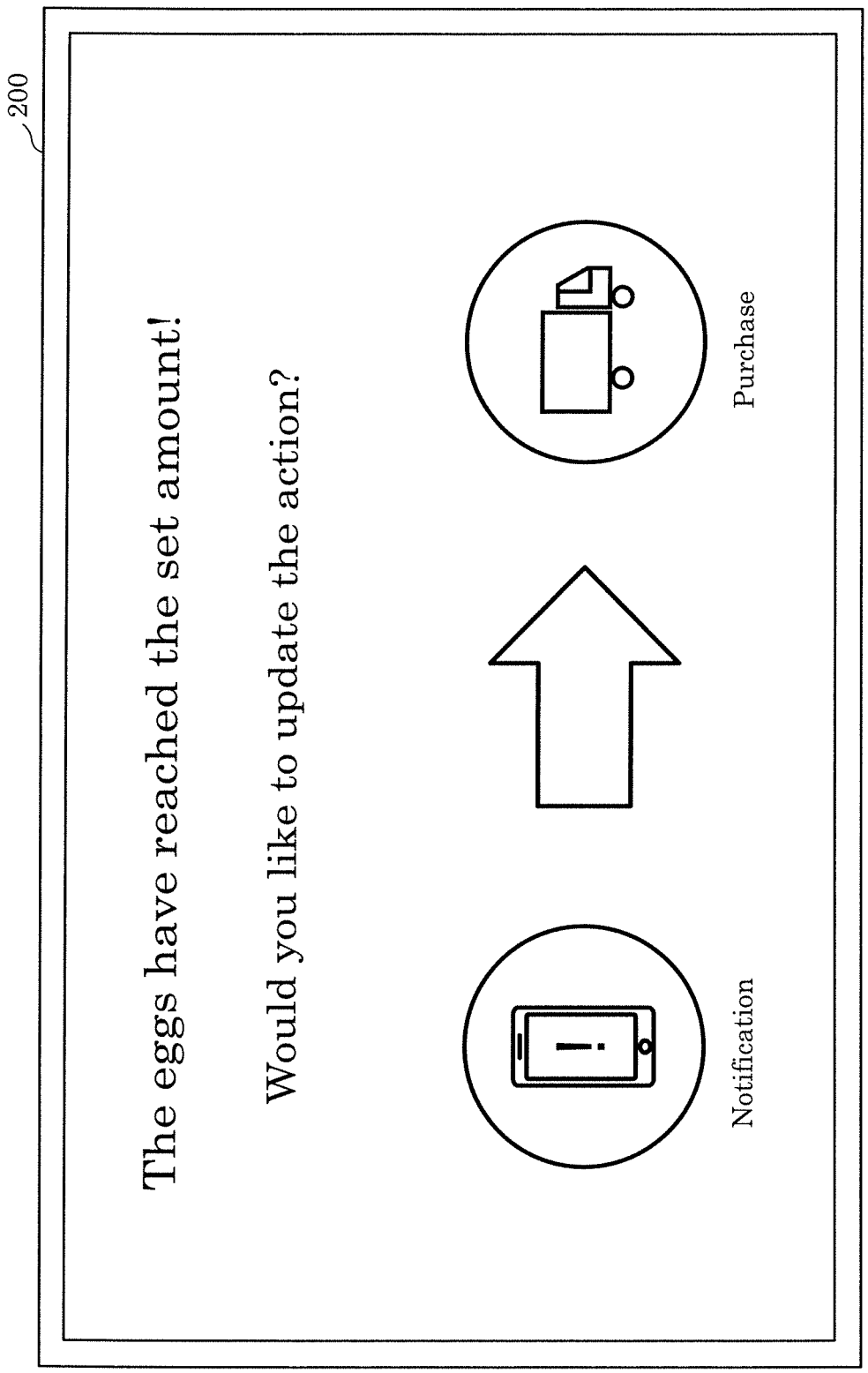
FIG. 32 shows an example of a screen displayed on a display according to Embodiment 4.

Referring to FIGS. 31 and 32, the processing of system 10 according to the present embodiment will be described below. FIG. 31 is a flowchart of processing for the actions of system 10 according to Embodiment 4. FIG. 32 shows an example of a screen displayed on display 240 according to Embodiment 4.

[Step S1500]

If it is determined that an amount of goods is not larger than a threshold amount (Yes at S1100), processor 110 determines whether to update a set first action to a second action different from the first action (S1500). For example, processor 110 displays a screen (e.g., FIG. 32) on display 240. The screen proposes an update from the first action to the second action based on past user actions performed after the first action performed by processing device 100. If a user instructs processor 110 to update the first action to the second action through the screen, processor 110 sets the second action as an action of processing device 100. The first action and the second action may be, for example, notification and purchase.

In the determination of updating, it is not always necessary to display the screen for proposing an update. For example, the first action may be automatically updated to the second action if the number of second actions exceeds a threshold number of times after the first action.

The second action is not limited to a past action actually performed by a user. For example, the second action may be selected by a user from the candidates of the second actions.

[Step S1600]

If it is determined that the first action is to be updated to the second action (Yes at S1500), processor 110 updates the setting from first output contents, which correspond to the first action, to second output contents, which correspond to the second action, and then performs the second action based on the second output contents. For example, if the second action is purchase, processor 110 transmits product purchase information to external server 20.

[Step S1700]

If it is determined that the first action is not to be updated to the second action (No at S1500), processor 110 performs the first action based on the first output contents. For example, if the first action is notification, processor 110 transmits screen information to terminal device 200. The screen information notifies terminal device 200 that an amount of goods is not larger than a threshold amount.

[Effects]

As described above, system 10 according to the present embodiment can update the output contents of processing device 100 based on a user action. This enables processing device 100 to perform an action suitable for the user, thereby improving convenience for the user.

Embodiment 5

Embodiment 5 will be described below. The present embodiment is mainly different from Embodiment 1 in that a threshold amount corresponding to the condition of trigger output can be also set by direct user input. Regarding system 10 of the present embodiment, differences from Embodiment 1 will be mainly discussed below.

In the present embodiment, an item detected by sensor 310 is a water bottle. The system configuration of the present embodiment is similar to that of Embodiment 1 and thus the illustration and explanation thereof are omitted.

[Operations of System 10]

Figure 33:
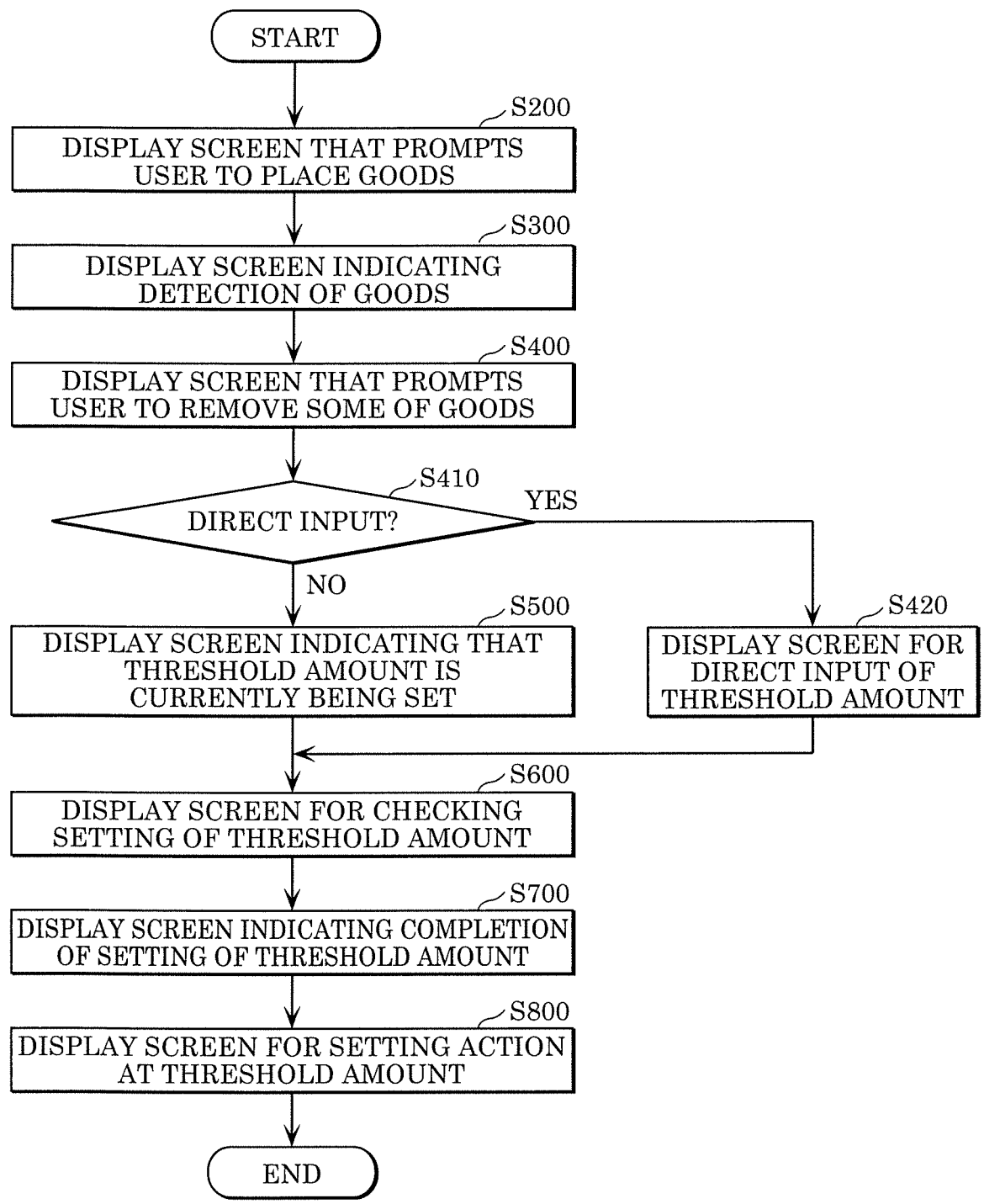
FIG. 33 is a flowchart of processing for setting of a system according to Embodiment 5.
Figure 35:
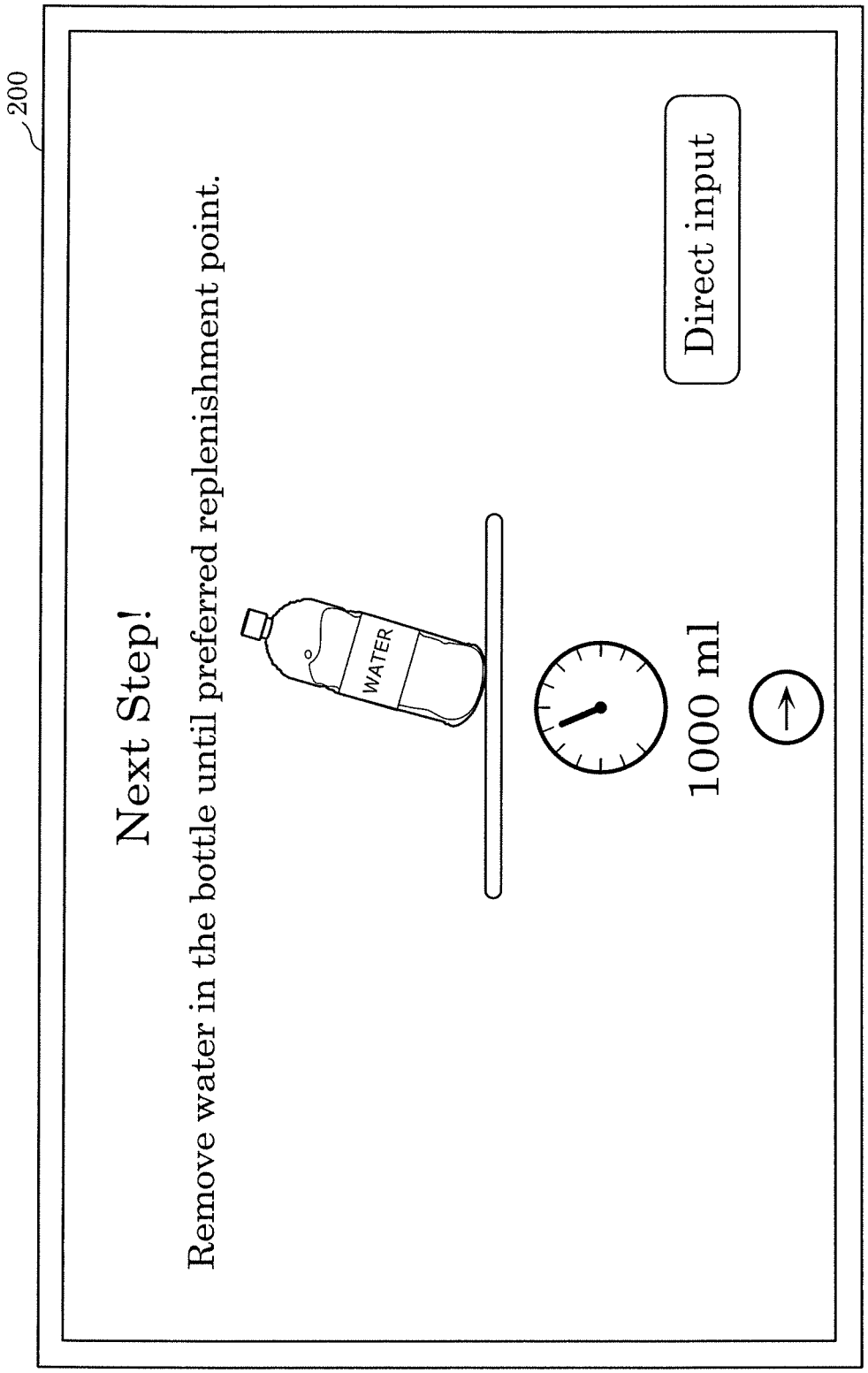
FIG. 35 shows a screen example displayed on a display in Embodiment 5.
Figure 36:
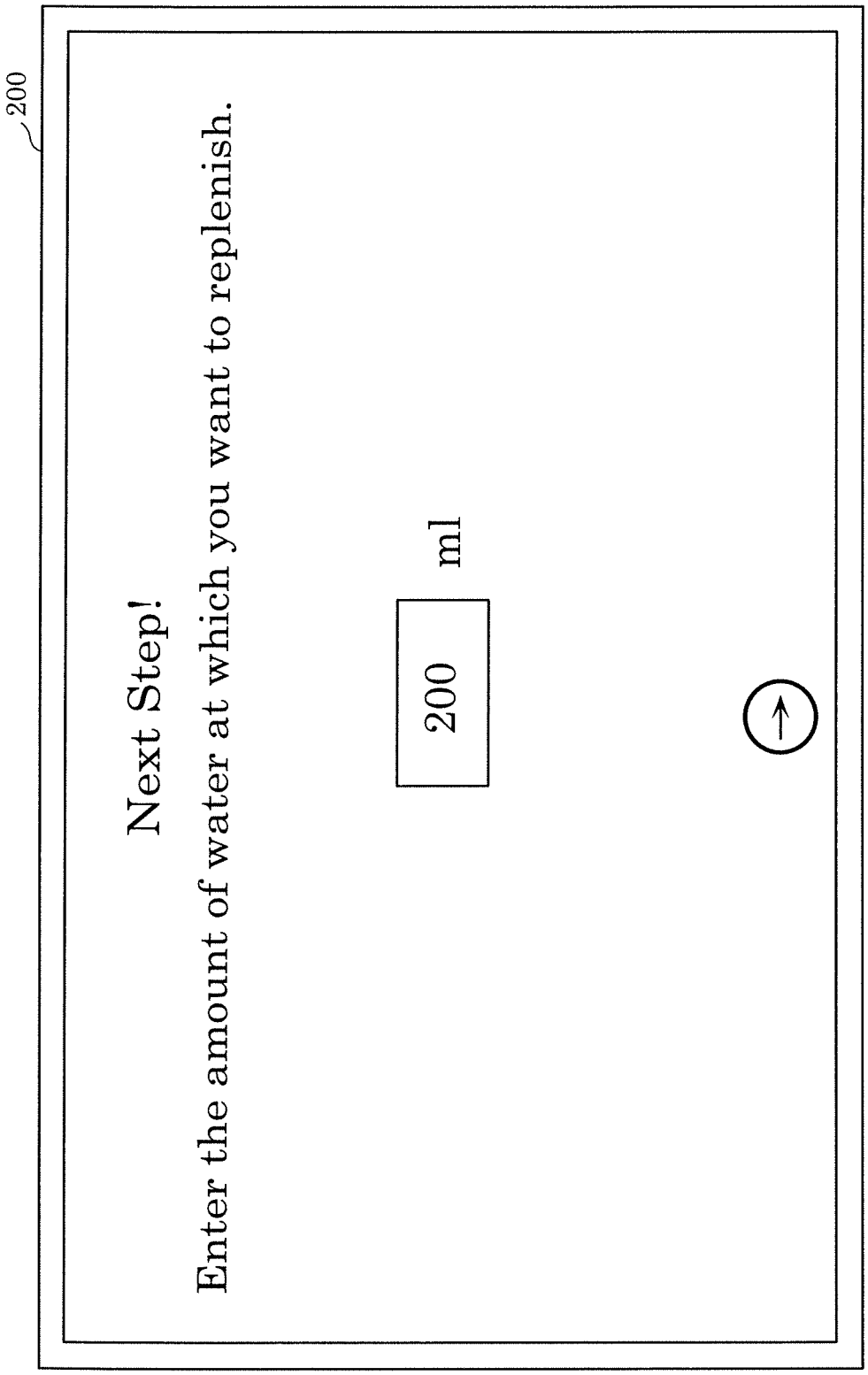
FIG. 36 shows a screen example displayed on the display in Embodiment 5.

Referring to FIGS. 33 to 36, the processing of system 10 according to the present embodiment will be described below. FIG. 33 is a flowchart of processing for the setting of system 10 according to Embodiment 5. FIG. 34 shows an example of the time series of the amount of goods in system 10 according to Embodiment 5. FIGS. 35 and 36 show screen examples displayed on display 240 in Embodiment 5.

[Step S410]

On a screen that prompts the removal of some goods, processor 110 determines whether an instruction has been provided to directly input a threshold amount without removing some goods. For example, if a "Direct Input" button is pressed on the screen of FIG. 35, processor 110 determines that an instruction to directly input the threshold amount has been provided.

[Step S420]

If it is determined that an instruction to directly input the threshold amount has been provided (Yes at S410), processor 110 displays a screen (e.g., FIG. 36) on display 240. The screen allows the user to directly input the threshold amount. In FIG. 36, a user input of a numeric value "200" is received. The input of the numeric value enables a right arrow button. When the enabled right arrow button is pressed, information on the inputted threshold amount is transmitted to processing device 100.

At this point, as shown in FIG. 34, the amount of goods detected by sensor 310 is kept at "1000 ml" but the threshold amount is set at "200 ml" based on direct input.

[Effects]

As described above, system 10 according to the present embodiment can set the threshold amount by direct input. System 10 is also applicable to an item (e.g., liquid or powder) that is difficult to partially remove.

In the present embodiment, the value of the threshold amount is directly inputted. The direct input is not limited to the threshold amount. For example, the amount of goods to be removed (difference between a maximum amount and the threshold amount) may be directly inputted.

Embodiment 6

Embodiment 6 will be described below. The present embodiment will discuss a service providing system that provides service including the provision of information on a screen to be displayed on a terminal device.

[Overall View of Provided Service]

Figure 37A:
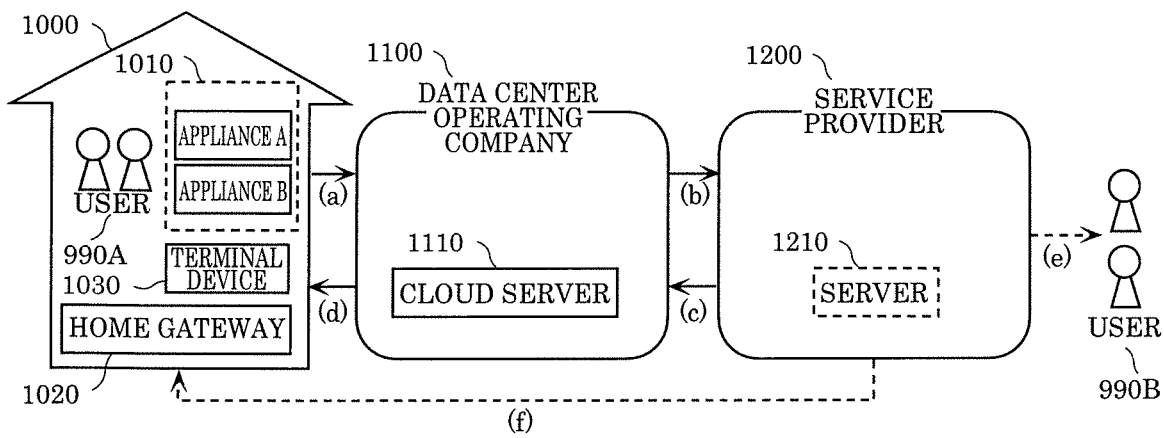
FIG. 37A shows an overall view of a service providing system according to Embodiment 6.

FIG. 37A shows an overall view of the service providing system according to Embodiment 6.

Group 1000 may be, for example, a company, an organization, or a home regardless of the size. Group 1000 includes terminal device 1030, appliance A and appliance B that are included in appliances 1010, and home gateway 1020. Terminal device 1030 is, for example, terminal device 200 according to the embodiments. Appliance A is, for example, refrigerator 300 according to the embodiments. Appliances 1010 include Internet appliances (e.g., a smartphone, a PC, and TV) and appliances unconnectable to the Internet (e.g., lighting and a washing machine). Appliances 1010 may include appliances that are unconnectable to the Internet but can be connected to the Internet via home gateway 1020. Moreover, group 1000 includes users 990A of appliances 1010.

Figure 37B:
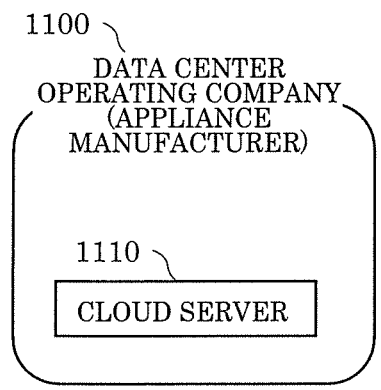
FIG. 37B shows an example of a data center operating company according to Embodiment 6.
Figure 37C:
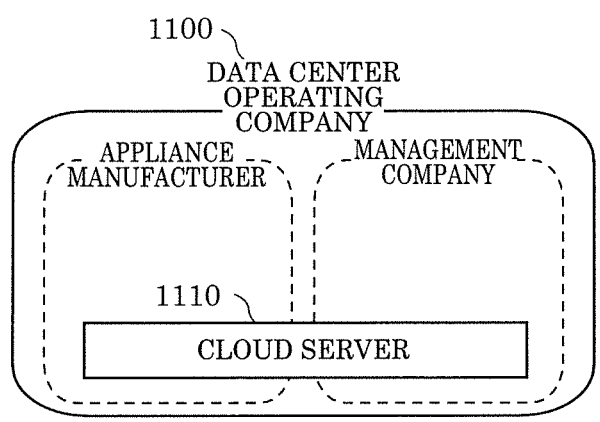
FIG. 37C shows an example of the data center operating company according to Embodiment 6.

Data center operating company 1100 includes cloud server 1110. Cloud server 1110 is a virtual server that interfaces with various appliances via the Internet. For example, cloud server 1110 is, for example, processing device 100 according to the embodiments. Cloud server 1110 mainly manages large data sets (big data) that are hard to handle with ordinary database management tools or the like. Data center operating company 1100 manages data and cloud server 1110 and operates a data center for the management. Service provided by data center operating company 1100 will be specifically discussed later. In this case, data center operating company 1100 is not limited to companies that are only involved in data management and the operation of cloud server 1110. For example, if an appliance manufacturer that develops and manufactures one of appliances 1010 also manages data and cloud server 1110, the appliance manufacturer corresponds to data center operating company 1100 (FIG. 37B). Data center operating company 1100 is not limited to a single company. For example, if an appliance manufacturer and another management company are involved in data management and the operation of cloud server 1110 in cooperative and sharing manners, at least one of the appliance manufacturer and the management company corresponds to data center operating company 1100 (FIG. 37C).

Service provider 1200 includes server 1210. In this configuration, server 1210 includes, for example, memory in a personal PC regardless of the size. Alternatively, the service provider may not include server 1210.

In this service, home gateway 1020 is not always necessary. For example, if cloud server 1110 totally manages data, home gateway 1020 is not necessary. Alternatively, home appliances may be all connected to the Internet and appliances unconnectable to the Internet may not be provided.

The flow of information in the service will be discussed below.

First, appliance A or appliance B of group 1000 transmits information obtained in each appliance to cloud server 1110 of data center operating company 1100. Cloud server 1110 gathers information on appliance A or appliance B ((a) of FIG. 37A). The gathered information indicates, for example, the operating condition, the operation date and time, the operation mode, and the position of each appliance 1010. For example, the information includes but is not limited to the viewing history of a television, information on the recording schedule of a recorder, the operating date and time of a washing machine, the amount of laundry, the date and time of opening/closing of a refrigerator, the number of times of opening/closing of a refrigerator, and the amount of foods in a refrigerator. Any kinds of information available from all the appliances can be used. Information may be directly provided for cloud server 1110 from appliances 1010 via the Internet. Alternatively, information may be temporarily gathered in home gateway 1020 from appliances 1010 and then provided for cloud server 1110 from home gateway 1020.

Subsequently, cloud server 1110 of data center operating company 1100 provides service provider 1200 with the gathered information in constant units. In this case, the constant units may be units that allow the data center operating company to organize and provide the gathered information for service provider 1200 or units requested from service provider 1200. The units are not limited to constant units. The amount of provided information may vary depending on the circumstances. The information is optionally stored in server 1210 provided in service provider 1200 ((b) in FIG. 37A). Subsequently, service provider 1200 organizes the information suitably for user service and then provides the information for users. The users provided with the information may be users 990A of appliances 1010 or external users 990B. The service may be directly provided for users from the service provider ((e) and (f) of FIG. 37A). The service may be provided for users after passing through, for example, cloud server 1110 of data center operating company 1100 again ((c) and (d) of FIG. 37A). Alternatively, cloud server 1110 of data center operating company 1100 may organize the information suitably for user service and then provide the information for service provider 1200.

User 990A and user 990B may be different from each other or identical to each other.

Techniques described in the foregoing embodiments can be implemented by, for example, the following types of cloud service. However, types of cloud service for implementing the techniques described in the embodiments are not limited to the following types:

[Service Type 1: Company-Owned Data Center]

Figure 38:
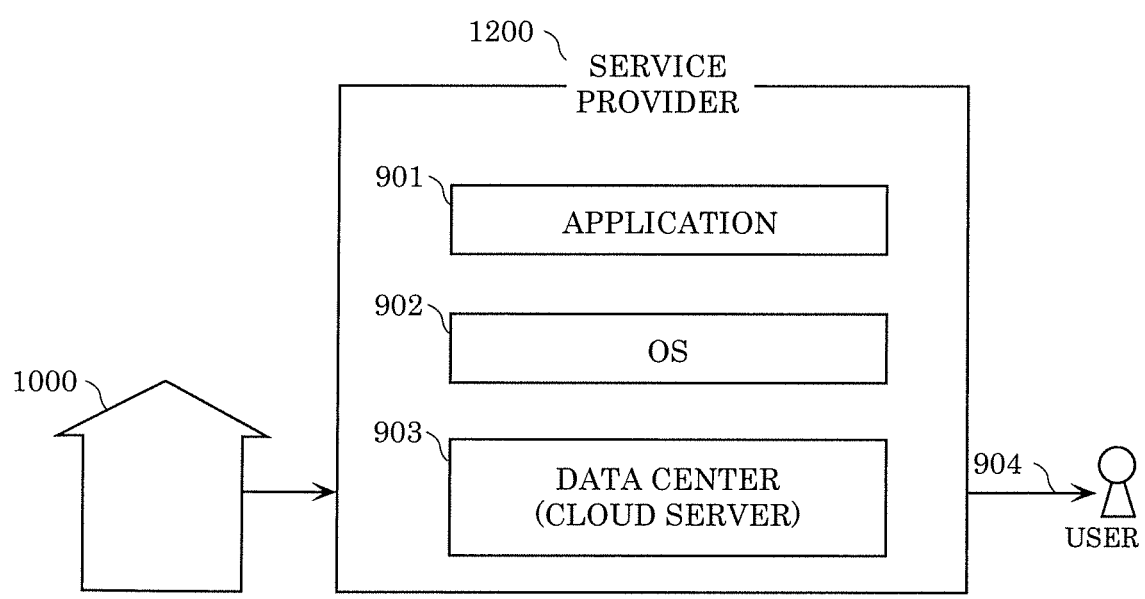
FIG. 38 shows service type 1 (company-owned data center) according to Embodiment 6.

FIG. 38 shows service type 1 (company-owned data center). In this type, service provider 1200 acquires information from group 1000 and provides service for users. In this type, service provider 1200 has the function of the data center operating company. Specifically, the service provider includes cloud server 1110 that manages big data. Thus, any data center operating company is not present.

In this type, service provider 1200 operates and manages data center 903 (cloud server 1110). Moreover, service provider 1200 manages OS 902 and application 901. Service provider 1200 provides service 904 by using OS 902 and application 901 that are managed by service provider 1200.

[Service Type 2: IaaS-Based]

Figure 39:
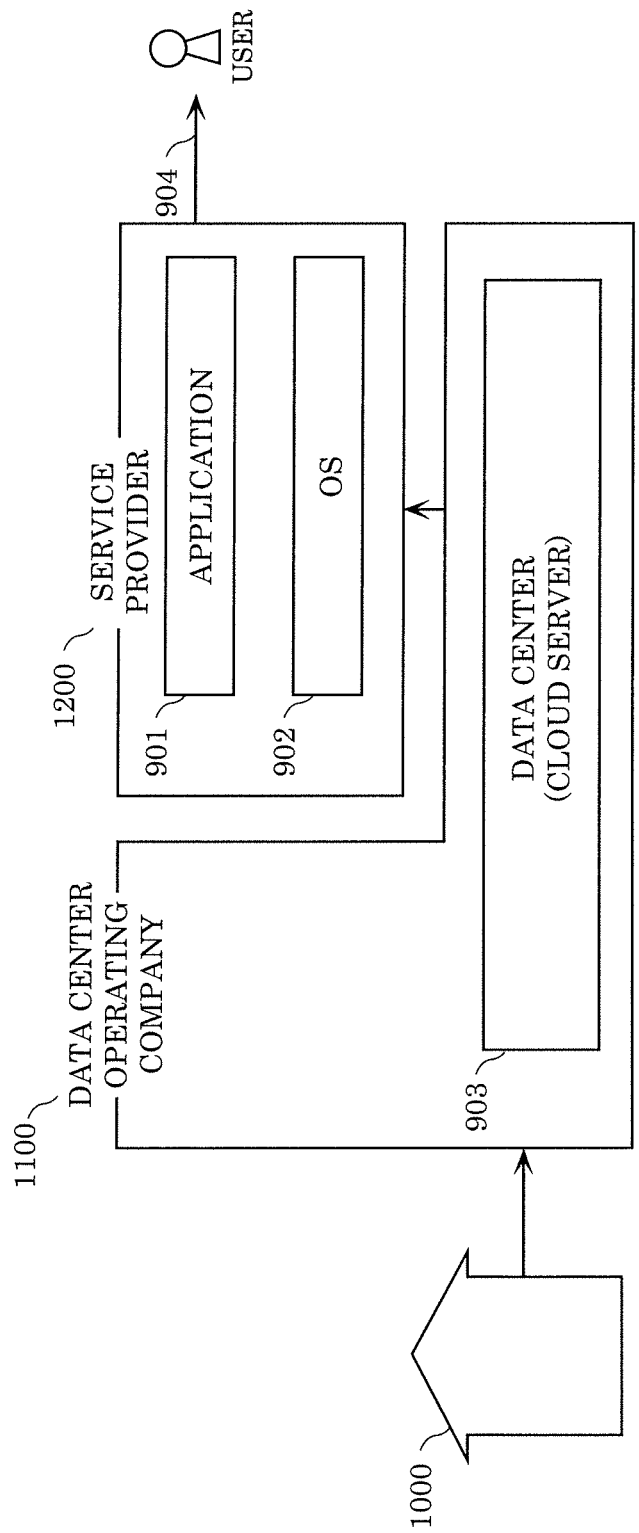
FIG. 39 shows service type 2 (IaaS-based) according to Embodiment 6.

FIG. 39 shows service type 2 (IaaS-based). IaaS stands for Infrastructure as a Service, which is a cloud service provision model for providing, as service via the Internet, an infrastructure for constructing and operating a computer system.

In this type, data center operating company 1100 operates and manages data center 903 (cloud server 1110). Moreover, service provider 1200 manages OS 902 and application 901. Service provider 1200 provides service 904 by using OS 902 and application 901 that are managed by service provider 1200.

[Service Type 3: PaaS-Based]

Figure 40:
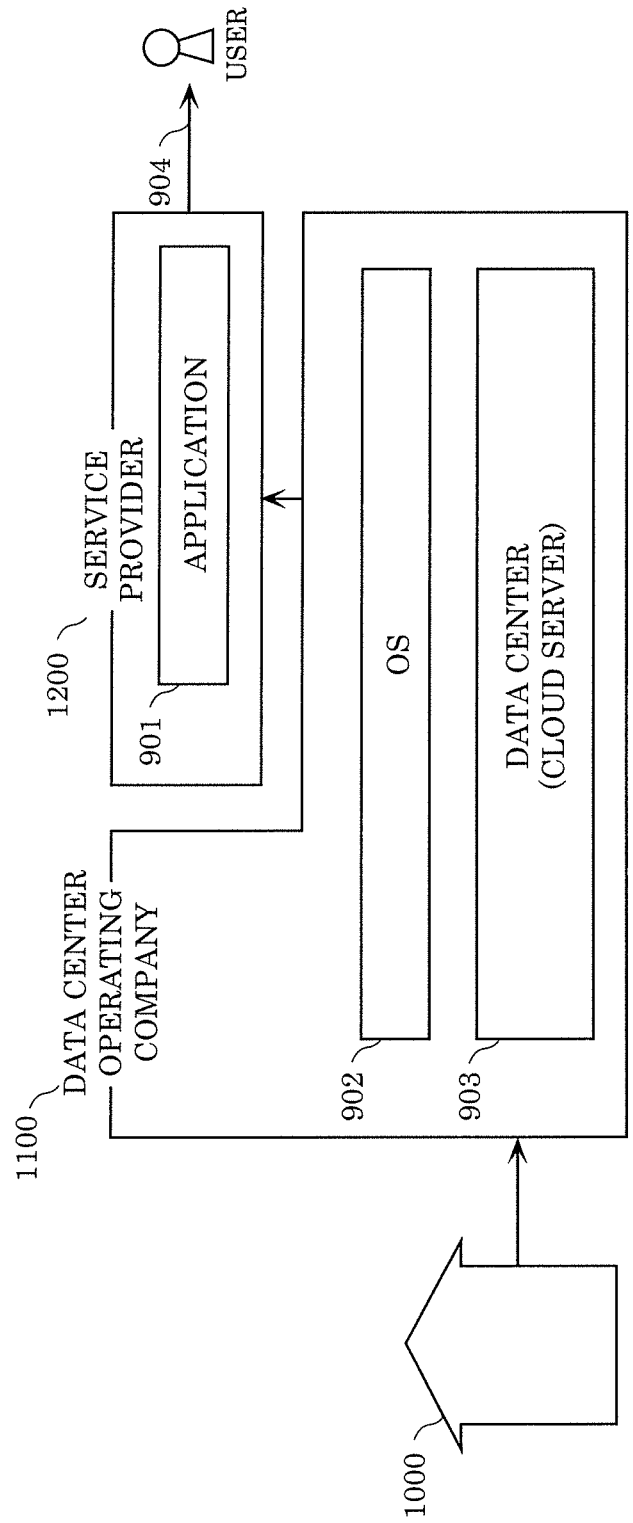
FIG. 40 shows service type 3 (PaaS-based) according to Embodiment 6.

FIG. 40 shows service type 3 (PaaS-based). PaaS stands for Platform as a Service, which is a cloud service provision model for providing, as service via the Internet, a platform for constructing and operating software.

In this type, data center operating company 1100 manages OS 902 and operates and manages data center 903 (cloud server 1110). Moreover, service provider 1200 manages application 901. Service provider 1200 provides service 904 by using OS 902 managed by the data center operating company and application 901 managed by service provider 1200.

[Service Type 4: SaaS-Based]

Figure 41:
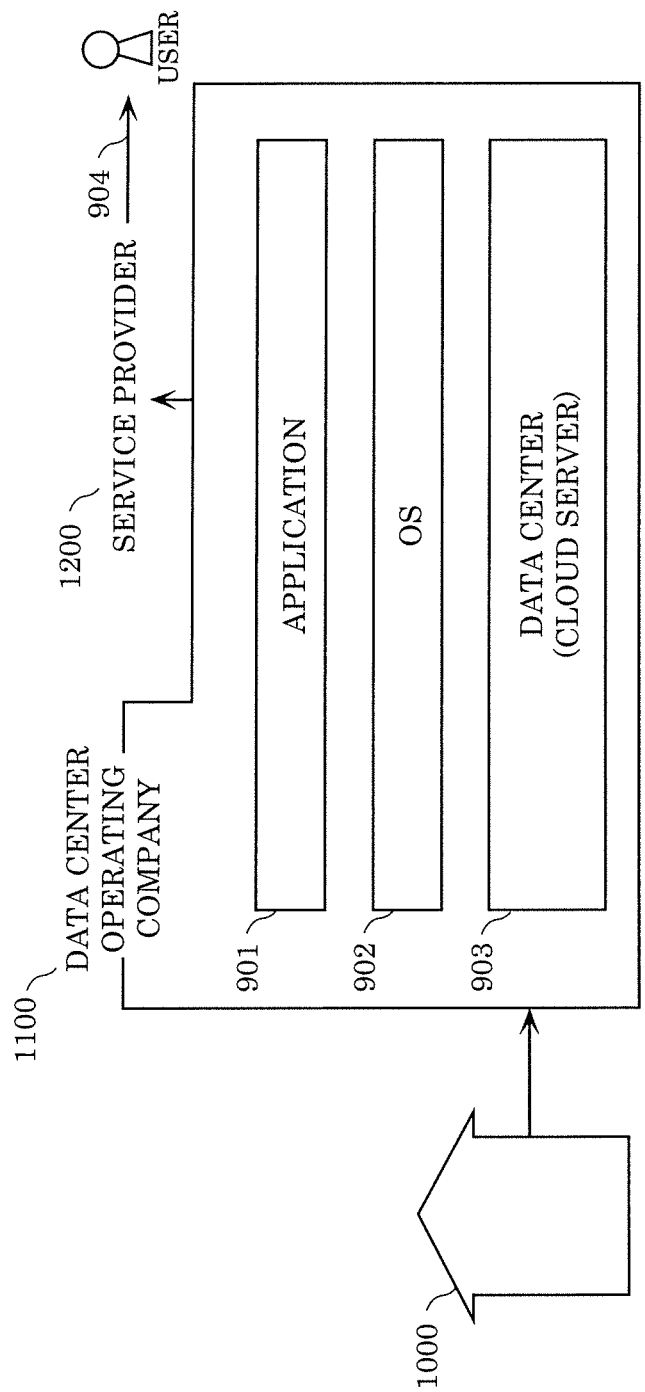
FIG. 41 shows service type 4 (SaaS-based) according to Embodiment 6.

FIG. 41 shows service type 4 (SaaS-based). SaaS stands for Software as a Service. For example, SaaS is a cloud service provision model that enables a company/individual (user) who does not have a data center (cloud server) to use an application provided by a platform provider having a data server (cloud server) via network such as the Internet.

In this type, data center operating company 1100 manages application 901, manages OS 902, and operates and manages data center 903 (cloud server 1110). Service provider 1200 provides service 904 by using OS 902 and application 901 that are managed by data center operating company 1100.

In all of the types, service is provided by service provider 1200. For example, the service provider or the data center operating company may develop its own application or the database of big data or outsource the development to a third party.

Another Variation

While the foregoing has described an information processing system according to one or more aspects of the present disclosure based on exemplary embodiments, the present invention is not limited to these embodiments. Various modifications to these embodiments conceivable to those skilled in the art, as well as embodiments resulting from combinations of structural elements in different embodiments may be included within the scope of one or more aspects of the present disclosure, so long as they do not depart from the essence of the present disclosure.

For example, in the foregoing embodiments, processing device 100 is separated from terminal device 200. The configuration is not particularly limited. For example, processing device 100 and terminal device 200 may be combined with each other.

In the foregoing embodiments, sensor 310 installed in refrigerator 300 was described as an example. The location of sensor 310 is not limited to refrigerator 300. For example, sensor 310 may be installed in a washing machine or a dish washer that has the function of automatically pouring detergent. In this case, sensor 310 detects the amount of detergent. The location of sensor 310 is not limited to an electronic device. For example, sensor 310 may be installed in a pantry, a detergent storage space, or a bathroom closet. The location of sensor 310 is not limited to a house. Sensor 310 may be installed in an office or a commercial facility including restaurants or may be installed outdoors. For example, sensor 310 may be installed in a delivery box at the entrance of a consumer' house or a milk box that contains delivered milk bottles. If sensor 310 is installed in the food storage room of a restaurant, a notification may be sent to the food stock control manager of the food storage room rather than to a user who serves dishes in the restaurant, as an example of the action of processing device 100.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a system that performs a predetermined action according to the amount of foods stored in a refrigerator.

What is claimed is:

1. A method of setting a system,
the system including:
a processing device including a processor and a memory; and
a sensor that is communicably connected to the processing device and detects an amount of goods,
the method being performed by the processor and comprising:
(a) when receiving detection of a first amount of goods by the sensor, displaying, on a display, a first screen prompting setting of a threshold amount of goods which corresponds to a condition of trigger output, the first amount being equal to or larger than a first predetermined amount;
(b) when the sensor detects that an amount of goods has been reduced by at least a second predetermined amount after the displaying of the first screen, acquiring, as the threshold amount, a second amount of reduced goods detected by the sensor;
(c) after the threshold amount is acquired, displaying, on the display, a second screen for setting a first action of the processing device; and
(d) based on information on the first action which has been set after the displaying of the second screen, setting first output contents which are to be output by the processing device upon satisfaction of the condition of trigger output.

2. The method according to claim 1, further comprising:
(e) determining whether a third amount of goods detected by the sensor is smaller than the threshold amount; and
(f) when it is determined that the third amount is smaller than the threshold amount, performing the first action based on the first output contents which have been set.

3. The method according to claim 1, further comprising:
(g) displaying a screen for setting usage of the sensor, wherein
in (d), the first output contents are set based on the usage of the sensor which has been set.

4. The method according to claim 3, further comprising:
(h) estimating that the usage of the sensor is detection of an amount of goods corresponding to a product purchased with the sensor, wherein
in (g), the screen showing the estimated usage of the sensor as a candidate is displayed.

5. The method according to claim 3, further comprising:
(h) estimating that the usage of the sensor is detection of an amount of goods corresponding to a finally purchased product, wherein
in (g), the screen showing the estimated usage of the sensor as a candidate is displayed.

6. The method according to claim 1, further comprising:
(i) determining whether a third amount of goods detected by the sensor is larger than a maximum amount; and
(j) when it is determined that the third amount is larger than the maximum amount, displaying, on the display, a screen prompting moving of goods other than the goods from a detection area of the sensor.

7. The method according to claim 6, wherein
in (i), the first amount is used as the maximum amount.

8. The method according to claim 1, further comprising:
(k) based on a user action performed after the first action is performed, updating the setting from the first output contents to second output contents corresponding to a second action different from the first action.

9. A non-transitory computer-readable recording medium for use in a computer, the recording medium having a computer program recorded thereon for causing the computer to execute the method according to claim 1.

10. A processing device comprising a processor and a memory,
wherein the processor, by using the memory;
(a) when receiving detection of a first amount of goods by a sensor that is communicably connected to the processing device and sequentially detects an amount of goods, displays, on a display, a first screen prompting setting of a threshold amount of goods which corresponds to a condition of trigger output, the first amount being equal to or larger than a first predetermined amount;
(b) when the sensor detects that an amount of goods has been reduced by at least a second predetermined amount after the display of the first screen, acquires, as the threshold amount, a second amount of reduced goods detected by the sensor;
(c) after the threshold amount is acquired, displays, on the display, a second screen for setting a first action of the processing device; and
(d) based on information on the first action which has been set after the display of the second screen, sets first output contents which are to be output by the processing device upon satisfaction of the condition of trigger output.

11. A processing device comprising:
a processor; and
a memory,
wherein the processor, by using the memory, is configured to:
receive, from a sensor that is communicably connected to the processing device, information identifying a detected amount of goods;
display first information on a display for prompting setting of a threshold amount of goods;
acquire the threshold amount of goods;
display second information on the display for prompting setting of a first action that is to be performed by the processing device based upon the amount of goods reaching the threshold amount; and
based on information on the first action which has been set after the display of the second information, set first output contents which are to be output by the processing device based upon the detected amount of goods reaching the threshold amount.

12. A processing method performed by a processing device, the processing method comprising:
- receiving, from a sensor that is communicably connected to the processing device, information identifying a detected amount of goods,
- displaying first information on a display for prompting setting of a threshold amount of goods;
- acquiring the threshold amount of goods;
- displaying second information on the display for prompting setting of a first action that is to be performed by the processing device based upon the amount of goods reaching the threshold amount; and
- based on information on the first action which has been set after the display of the second information, setting first output contents which are to be output by the processing device based upon the detected amount of goods reaching the threshold amount.

* * * * *